(12) United States Patent
Kojima

(10) Patent No.: US 8,853,981 B2
(45) Date of Patent: Oct. 7, 2014

(54) DRIVING APPARATUS FOR MULTIPLEX-WINDING MOTOR

(71) Applicant: Tetsuya Kojima, Tokyo (JP)

(72) Inventor: Tetsuya Kojima, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 83 days.

(21) Appl. No.: 13/746,651

(22) Filed: Jan. 22, 2013

(65) Prior Publication Data

US 2013/0234635 A1 Sep. 12, 2013

(30) Foreign Application Priority Data

Mar. 7, 2012 (JP) .................................. 2012-049876

(51) Int. Cl.

| H02H 7/08 | (2006.01) |
|---|---|
| H02P 25/22 | (2006.01) |
| H02P 23/00 | (2006.01) |
| H02P 6/12 | (2006.01) |

(52) U.S. Cl.
CPC ............ *H02P 25/22* (2013.01); *H02P 23/0095* (2013.01); *H02P 6/12* (2013.01)
USPC .................................. 318/400.21; 318/400.22

(58) Field of Classification Search
USPC ........................................ 318/400.21, 400.22
See application file for complete search history.

(56) References Cited

U.S. PATENT DOCUMENTS

| 5,357,181 A | 10/1994 | Mutoh et al. |
|---|---|---|
| 2011/0074323 A1 | 3/2011 | Mukai |
| 2011/0074333 A1 | 3/2011 | Suzuki |
| 2011/0156629 A1 | 6/2011 | Satou et al. |
| 2012/0001573 A1 | 1/2012 | Kimpara et al. |

FOREIGN PATENT DOCUMENTS

| JP | 2861680 B2 | 2/1999 |
|---|---|---|
| JP | 3683382 B2 | 8/2005 |
| JP | 2011-078221 A | 4/2011 |
| JP | 2011-078230 A | 4/2011 |
| JP | 201 1-1 31 860 A | 7/2011 |
| WO | 2010/109528 A1 | 9/2010 |

*Primary Examiner* — Erick Glass
(74) *Attorney, Agent, or Firm* — Sughrue Mion, PLLC; Richard C. Turner

(57) ABSTRACT

Provided are a current detection apparatus having sensor sections detecting motor currents flowing in the windings for the phases of the winding groups, a control apparatus calculating voltage instructions with respect to each winding group, based on the motor current detected by each sensor section, a voltage application apparatus applying voltage to each winding group, based on the voltage instructions, and a failure detection apparatus detecting whether or not each sensor section has failed. The control apparatus, when the failure detection apparatus has detected failure of some of the sensor sections, in accordance with the detection, calculates a voltage instruction with respect to the winding group corresponding to the failure of the sensor section, based on motor current with respect to another winding group detected by the sensor section that can normally detect current.

14 Claims, 12 Drawing Sheets

DRIVING APPARATUS FOR MULTIPLEX-WINDING MOTOR

BACKGROUND OF THE INVENTION

1. Field of the Invention

The present invention relates to a driving apparatus for a multiplex-winding motor having a plurality of winding groups each including windings respectively corresponding to a plurality of phases, the driving apparatus being capable of continuing to drive the multiplex-winding motor even when current detection means which detects current flowing in each winding has failed.

2. Description of the Background Art

A driving apparatus for a motor, in order to drive the motor in a desired state, detects current flowing in a winding of the motor by current detection means, to perform control to generate a voltage instruction for voltage application to the motor, and applies, to the motor, voltage based on the voltage instruction by a voltage application apparatus, thereby driving the motor.

The current detection apparatus, the voltage application apparatus, a motor winding, and the like composing the motor driving apparatus can sometimes fail, and accordingly, various methods for continuing to drive the motor even when failure occurs are proposed as disclosed in the following Patent Documents 1 to 4, for example.

That is, Patent Document 1 discloses that, in a three-phase AC electric motor, three current sensors are provided; when only one of the three current sensors has failed, current of the failed current sensor is estimated from two currents obtained from the other two current sensors that are normal, and a voltage instruction for voltage application to the three-phase AC electric motor is determined through control by a current control apparatus using the estimated current; and when two or more of the current sensors have failed, the operation is switched so as to obtain a voltage instruction from a torque instruction and a rotation angle velocity of the three-phase AC electric motor.

Patent Document 2 discloses that, in a multiphase rotary machine having a plurality of winding groups each including windings for a plurality of phases, a plurality of inverter sections each having switching means corresponding to each phase of windings are provided for the respective winding groups, and that, when OFF-failure occurs in which conduction of the switching apparatus is not allowed, in the failed inverter section which includes the switching apparatus that has failed, the switching apparatuses other than the switching apparatus that has failed in the failed inverter section are controlled based on a failure phase current instruction value calculated as a function about the rotational position of the multiphase rotary machine and a torque instruction or a function about the rotational position and a q-axis current instruction value, and a normal inverter section other than the failed inverter section is controlled in the same manner as in normal state.

Patent Document 3 discloses that, in a multiphase rotary machine having a plurality of winding groups each including windings corresponding to a plurality of phases, inverter sections of a plurality of systems, each having a leg composed of a high-potential-side switching device and a low-potential-side switching device corresponding to each phase of the multiphase rotary machine, are provided for the respective winding groups, and that, when short-circuit failure occurs in which the switching device keeps conductive state regardless of control to turn off the switching device, all the switching devices in the failed system are controlled to be OFF while the multiphase rotary machine continues to be driven by the leg in the system that does not fail, and the switching devices in the system that does not fail are controlled so as to cancel output caused along with the short-circuit failure in the failed system and operating against the drive of the multiphase rotary machine, or so as to reduce the influence of the output on the driving.

Patent Document 4 discloses an electric power steering apparatus which assists steering force of a driver by using driving force for an electric motor, the electric power steering apparatus including: a control apparatus which sets a current instruction value needed for the driving force of the electric motor; a plurality of power converters; a plurality of groups of windings, corresponding to the plurality of power converters, which generate the driving force of the electric motor by being respectively supplied with current from the plurality of power converters; and a failure detection apparatus which detects failure of the power converter or the winding. When the failure detection apparatus has detected failure, the current instruction value is reduced from that in normal state, and current is continuously supplied from the normal one of the power converters to the corresponding windings.

Patent Document 1: Japanese Patent No. 2861680
Patent Document 2: Japanese Laid-Open Patent Publication No. 2011-78221
Patent Document 3: Japanese Laid-Open Patent Publication No. 2011-78230
Patent Document 4: Japanese Laid-Open Patent Publication No. 2011-131860

The conventional techniques disclosed in the above Patent Documents 1 to 4 have the following problems.

That is, Patent Document 1 proposes a method for, in the three-phase AC electric motor, continuing to drive the motor when the current detection apparatus has failed, but does not disclose any measure for the case where the current detection apparatus has failed in a multiplex-winding motor.

In Patent Documents 2 to 4, voltage application apparatuses such as a plurality of inverters are provided for the respective winding groups of the multiplex-winding motor, whereby, even if some of the motor windings or the voltage application apparatuses have failed, the motor can continue to be driven by the other normal motor windings and voltage application apparatus. However, they do not disclose any control method for the case where the current detection apparatus has failed.

SUMMARY OF THE INVENTION

An object of the present invention is to provide a driving apparatus for a multiplex-winding motor, capable of continuing to drive the multiplex-winding motor even when a current detection apparatus for detecting current flowing in each winding of the multiplex-winding motor has failed.

A driving apparatus for a multiplex-winding motor according to the present invention drives the multiplex-winding motor having a plurality of winding groups each including windings corresponding to a plurality of phases, and the driving apparatus includes a current detection apparatus having sensor sections for detecting motor currents flowing in the windings for the phases of the plurality of winding groups, a control apparatus for calculating voltage instructions with respect to each winding group, based on the motor current detected by each sensor section of the current detection apparatus, a voltage application apparatus for applying voltage to each winding group, based on the voltage instructions, and a failure detection apparatus for individually detecting whether or not each sensor section of the current detection apparatus has failed. And the control apparatus, when the failure detection apparatus has detected failure of some of the sensor sections, in accordance with the detection, calculates a voltage instruction with respect to the winding group corresponding to the failure of the sensor section, based on motor current with respect to another winding group detected by the sensor section that can normally detect current.

According to the present invention, in the driving apparatus for the multiplex-winding motor, even when the current detection apparatus for detecting motor current flowing in each winding of the multiplex-winding motor has failed, the multiplex-winding motor can continue to be driven, thus providing non-conventional significant effect of suppressing variation in the output characteristics of the multiplex-winding motor.

The foregoing and other objects, features, aspects and advantages of the present invention will become more apparent from the following detailed description when read in conjunction with the accompanying drawings.

DETAILED DESCRIPTION OF THE PREFERRED EMBODIMENTS OF THE INVENTION

First Embodiment

Figure 1:
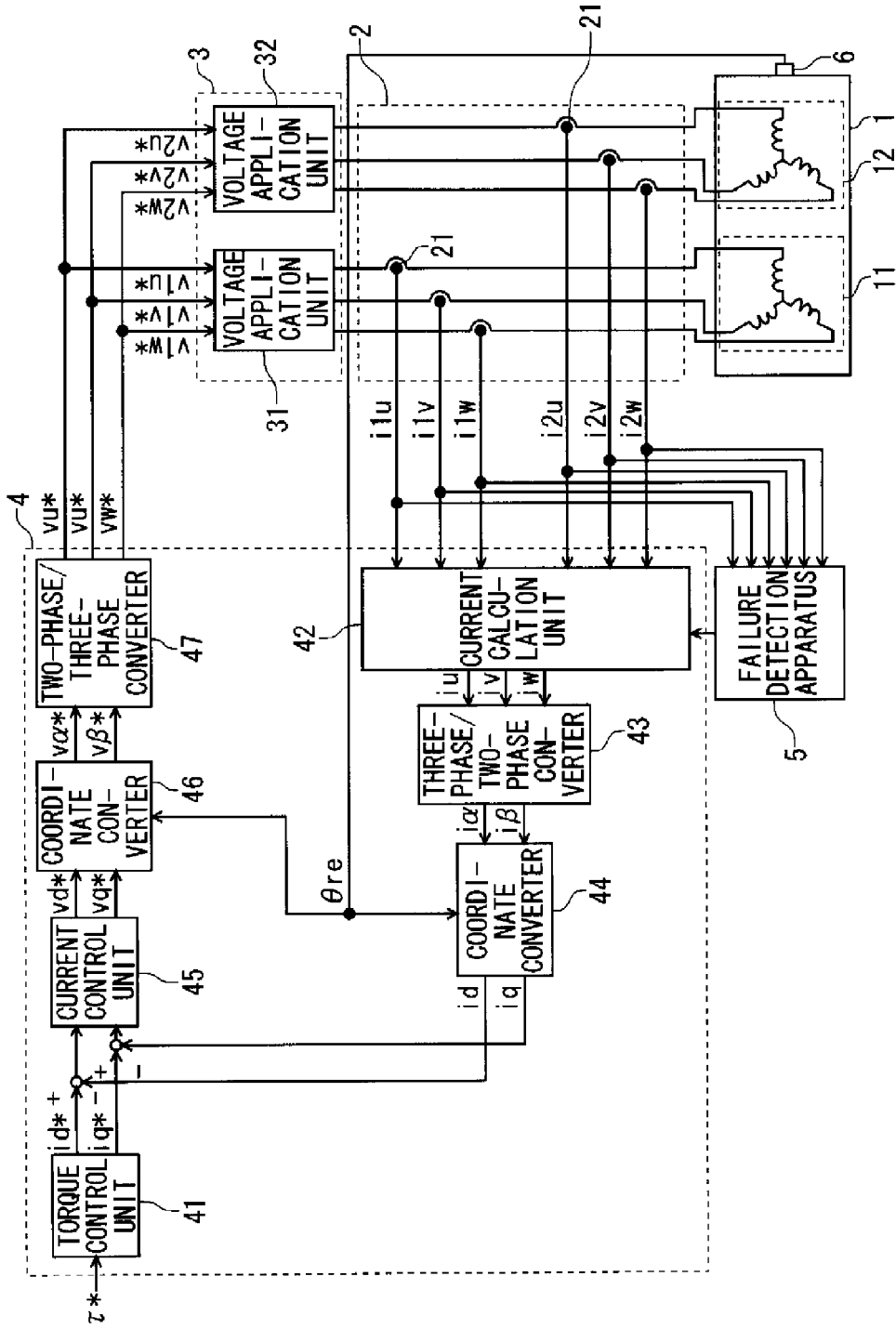
FIG. 1 is a configuration diagram of a driving apparatus for a multiplex-winding motor according to the first embodiment of the present invention.

FIG. 1 is a configuration diagram of a driving apparatus for a multiplex-winding motor according to the first embodiment of the present invention.

The multiplex-winding motor 1 of the first embodiment is a synchronous motor having two groups of windings, i.e., a first winding group 11 composed of three-phase windings and a second winding group 12 composed of three-phase windings provided for a stator, and using permanent magnet for a rotor. The first winding group 11 and the second winding group 12 have no phase difference therebetween.

The motor model of the multiplex-winding motor 1 having the above configuration is represented by the following expression in a rotational coordinate system synchronized with a magnetic pole position θre of the motor.

$$\begin{bmatrix} v1d \\ v1q \\ v2d \\ v2q \end{bmatrix} = R \begin{bmatrix} i1d \\ i1q \\ i2d \\ i2q \end{bmatrix} + \begin{bmatrix} PL_{11} & -\omega_{re}L_{11} & PM_{12} & -\omega_{re}M_{12} \\ \omega_{re}L_{11} & PL_{11} & \omega_{re}M_{12} & PM_{12} \\ PM_{12} & -\omega_{re}M_{12} & PL_{11} & -\omega_{re}L_{11} \\ \omega_{re}M_{12} & PM_{12} & \omega_{re}L_{11} & PL_{11} \end{bmatrix} \begin{bmatrix} i1d \\ i1q \\ i2d \\ i2q \end{bmatrix} + \omega_{re}\phi \begin{bmatrix} 0 \\ 1 \\ 0 \\ 1 \end{bmatrix}$$

(1-1)

Here, P is a differential operator, v1$d$ is a rotational coordinate system d-axis component of the first winding group voltage, v1$q$ is a rotational coordinate system q-axis component of the first winding group voltage, v2$d$ is a rotational coordinate system d-axis component of the second winding group voltage, v2$q$ is a rotational coordinate system q-axis component of the second winding group voltage, i1$d$ is a rotational coordinate system d-axis component of the first winding group current, i1$q$ is a rotational coordinate system q-axis component of the first winding group current, i2$d$ is a rotational coordinate system d-axis component of the second winding group current, i2$q$ is a rotational coordinate system q-axis component of the second winding group current, R is winding resistance, $L_{11}$ is winding self-inductance, $M_{12}$ is mutual inductance (between different winding groups), Φ is magnetic flux, and $\omega_{re}$ is rotation angle velocity (electric angle).

According to the above motor model, when the same voltage is applied to the two winding groups 11 and 12, currents flowing in the winding groups 11 and 12 are equal to each other in the respective phases, and when the same current is applied to the winding groups 11 and 12 in the respective phases, voltages applied to the winding groups 11 and 12 are equal to each other.

A voltage application apparatus 3 composed of two voltage application units 31 and 32 which individually apply voltages to the winding groups 11 and 12, respectively, is connected to the winding groups 11 and 12 of the multiplex-winding motor 1. The voltage application units 31 and 32 supply predetermined voltages to the winding groups 11 and 12 of the multiplex-winding motor 1, based on voltage instructions v1$u$*, v1$v$*, and v1$w$* and voltage instructions v2$u$*, v2$v$*, and v2$w$*, respectively, which are outputted from a control apparatus 4 described later. It is noted that, for example, power conversion apparatuses such as inverters are applied as the voltage application units 31 and 32.

In addition, a current detection apparatus 2 is provided between the multiplex-winding motor 1 and the voltage application apparatus 3. The current detection apparatus 2 has sensor sections 21 individually provided for the windings for the respective phases of the winding groups 11 and 12, and motor currents i1u, i1v, i1w, i2u, i2v, and i2w flowing in the windings for the respective phases are detected by the sensor sections 21. It is noted that, for example, a CT (current transformer) is applied as the sensor sections 21 of the current detection apparatus 2.

In addition, a failure detection apparatus 5 which detects failure of each sensor section 21 of the current detection apparatus 2, and a magnetic pole position detection apparatus 6 which detects the magnetic pole position of the multiplex-winding motor 1, are provided. For example, a resolver, a rotary encoder, or the like is applied as the magnetic pole position detection apparatus 6 in this case.

The failure detection apparatus 5 detects whether or not each sensor section 21 of the current detection apparatus 2 has failed, individually. Here, by using the fact that current flowing in the multiplex-winding motor 1 when the multiplex-winding motor 1 is not driven is zero, if current detected by each sensor section 21 of the current detection apparatus 2 when the multiplex-winding motor 1 is not driven is larger than a predetermined threshold value, it is determined that the detection function for the phase, of the winding group, corresponding to such a sensor section 21 of the current detection apparatus 2 has failed.

It is noted that although not shown here, apparatuses for individually detecting failure of the multiplex-winding motor 1 and failure of the voltage application apparatus 3 are provided separately. The same holds true for the other embodiments described later.

In addition, the driving apparatus for the multiplex-winding motor of the first embodiment has the control apparatus 4 which outputs, to the voltage application apparatus 3, the voltage instructions v1u*, v1v*, v1w*, v2u*, v2v*, and v2w* for supplying a predetermined voltage to the multiplex-winding motor 1. Particularly, a feature of the first embodiment is that a current calculation unit 42 for coping with the case where each sensor section 21 of the current detection apparatus 2 has failed is provided in the control apparatus 4. Hereinafter, the control apparatus 4 will be described in more detail.

A torque control unit 41 generates current instruction values id* and iq* in a rotational coordinate system synchronized with the magnetic pole position θre of the motor, in accordance with a desired driving condition of the motor such as rotation rate or torque, here, from a torque instruction τ*.

Meanwhile, the current calculation unit 42 calculates motor currents iu, iv, and iw for the respective phases used for current control, from the motor currents i1u, i1v, i1w, i2u, i2v, and i2w detected by the current detection apparatus 2. The detail of the calculation will be described later. Next, a three-phase/two-phase converter 43 converts the motor currents iu, iv, and iw for the respective phases to current values iα and iβ in a two-axis coordinate system at rest. Subsequently, a coordinate converter 44 converts the current values iα and iβ in a two-axis coordinate system at rest to current values id and iq in a rotational coordinate system.

A current control unit 45 performs, for example, proportional integral control for the difference between a D-axis current instruction id* and D-axis current id, and the difference between a Q-axis current instruction iq* and Q-axis current iq, thereby calculating a D-axis voltage instruction vd* and a Q-axis voltage instruction vq*. A coordinate converter 46 converts the voltage instructions vd* and vq* in a rotational coordinate system to voltage instructions vα* and vβ* in a two-axis coordinate system at rest. A two-phase/three-phase converter 47 converts the voltage instructions vα* and vβ* in a two-axis coordinate system at rest to voltage instruction values vu*, vv*, and vw* for the respective phases, and outputs them. Then, the voltage instruction values vu*, vv*, and vw* are each divided into two voltage instructions to be given to the respective voltage application units 31 and 32 of the voltage application apparatus 3, so that the voltage instructions v1u*, v1v*, and v1w* and the voltage instructions v2u*, v2v*, and v2w* given to the respective voltage application units 31 and 32 are equal to each other in the respective phases, that is, v1u*=v2u*=vu*, v1v*=v2v*=vv*, and v1w*=v2w*=vw* are satisfied.

It is noted that in the case where the voltage ratios or the current ratios are different between the winding groups 11 and 12, in consideration of the voltage ratios or the current ratios, the voltage instructions v1u*, v1v*, and v1w* and the voltage instructions v2u*, v2v*, and v2w* outputted from the control apparatus 4 are corrected in advance so that the voltage instructions v1u*, v1v*, and v1w* and the voltage instructions v2u*, v2v*, and v2w* for the two winding groups 11 and 12 become equal to each other in the respective phases. The same holds true for the other embodiments described later.

The current calculation unit 42 calculates the motor currents iu, iv, and iw for the respective phases, based on detection output from the failure detection apparatus 5, by a method different between when the sensor sections 21 of the current detection apparatus 2 can normally detect current and when failure has occurred.

First, in the case where all the sensor sections 21 of the current detection apparatus 2 can normally detect current, the motor currents iu, iv, and iw for the respective phases are calculated by using the following expression.

$$iu = \frac{i1u + i2u}{2} \quad (1\text{-}2)$$
$$iv = \frac{i1v + i2v}{2}$$
$$iw = \frac{i1w + i2w}{2}$$

On the other hand, in the case where some of the sensor sections 21 of the current detection apparatus 2 have failed and some of the motor currents of one winding group cannot be accurately detected by the sensor sections 21, instead of using these motor currents, the motor currents for the respective phases of the other winding group for which current is normally detected are used to perform the calculation. For example, in the case where the two motor currents i1u and i1v with respect to the first winding group 11 cannot be detected because of failure of the sensor sections 21, the motor currents iu, iv, and iw for the respective phases are calculated by using the motor currents i2u and i2v detected by the sensor sections 21 with respect to the other winding group 12, as shown by the following expression.

$$iu = i2u \quad (1\text{-}3)$$
$$iv = i2v$$
$$iw = \frac{i1w + i2w}{2}$$

As shown by the motor model of expression (1-1), when the same voltage is applied to the two winding groups 11 and 12 or the same current is applied to them, expression (1-2) and expression (1-3) are equal to each other. Therefore, even in the case of failure, it is possible to continue to drive the multiplex-winding motor 1 while calculating the motor currents.

As described above, according to the first embodiment, in the case where some of the sensor sections 21 of the current detection apparatus 2 have failed and the motor currents of one of the two winding groups 11 and 12 cannot be accurately detected, voltage instructions for the respective phases are calculated based on the motor currents obtained with respect to the other winding group for which current can be normally detected, thereby continuing to drive the multiplex-winding motor 1, thus providing non-conventional effect of suppressing variation in the output characteristics of the multiplex-winding motor 1.

In addition, in conventional techniques, in the case where the motor currents flowing in the windings for two or more phases included in one of the winding groups 11 and 12 cannot be detected because of failure of the sensor sections 21 of the current detection apparatus 2, the motor currents for the respective phases cannot be calculated, and instead, voltage instructions are obtained by using a torque instruction and a rotation angle velocity of the motor. Therefore, it is impossible to continue to drive the motor with excellent control responsiveness. On the other hand, in the first embodiment, even in the case where the motor currents flowing in the windings for two or more phases included in one of the winding groups 11 and 12 cannot be detected because of failure of the current detection apparatus 2, if the motor currents flowing in the other winding group can be detected, the motor currents for the respective phases are calculated by using the detected currents. Therefore, non-conventional effect of continuing to drive the multiplex-winding motor 1 with excellent control responsiveness is provided.

Second Embodiment

Figure 2:
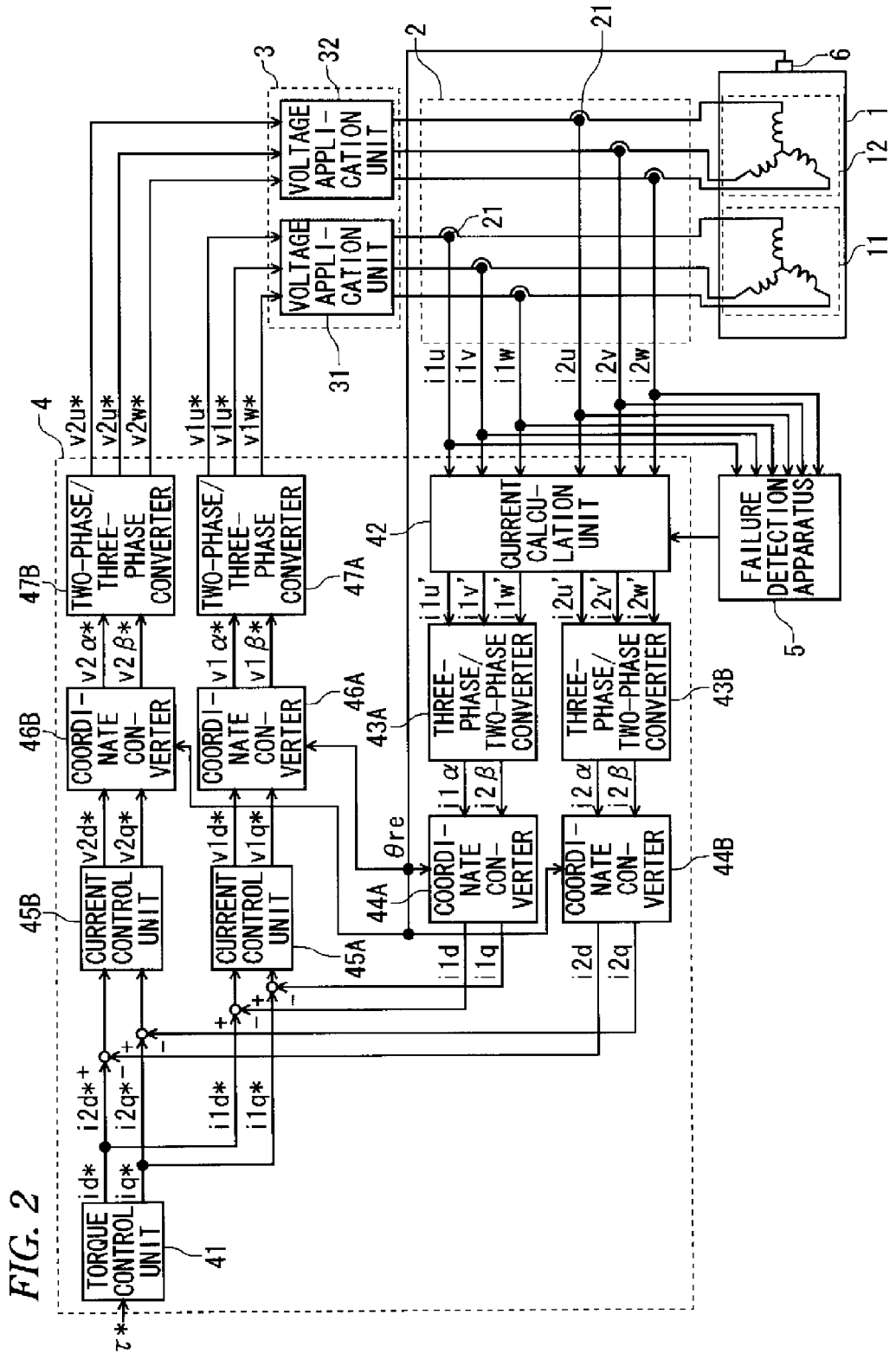
FIG. 2 is a configuration diagram of a driving apparatus for a multiplex-winding motor according to the second embodiment of the present invention.

FIG. 2 is a configuration diagram of a driving apparatus for a multiplex-winding motor according to the second embodiment of the present invention. Components that correspond to or are the same as those of the first embodiment (FIG. 1) are denoted by the same reference numerals.

In the second embodiment, the configuration of the control apparatus 4 is different from that of the first embodiment. That is, in the second embodiment, the control apparatus 4 gives the voltage instructions $v1u^*$, $v1v^*$, and $v1w^*$ to one voltage application unit 31 of the voltage application apparatus 3, and the voltage instructions $v2u^*$, $v2v^*$, and $v2w^*$ to the other voltage application unit 32, thereby performing motor driving control for each of the winding groups 11 and 12 individually.

Specifically, the control apparatus 4 generates the current instruction values $id^*$ and $iq^*$ in a rotational coordinate system synchronized with the magnetic pole position θre of the multiplex-winding motor 1, by using the torque control unit 41, and divides each of them into two current instruction values, to obtain current instruction values $i1d^*$ and $i1q^*$ and current instruction values $i2d^*$ and $i2q^*$ in a rotational coordinate system. Then, the control apparatus 4 performs current control for each of the winding groups 11 and 12, based on the current instruction values $i1d^*$ and $i1q^*$ and the current instruction values $i2d^*$ and $i2q^*$, thereby generating the voltage instructions $v1u^*$, $v1v^*$, and $v1w^*$ and the voltage instructions $v2u^*$, $v2v^*$, and $v2w^*$ with respect to the two winding groups 11 and 12.

The current calculation unit 42 calculates motor currents $i1u'$, $i1v'$, and $i1w'$ and motor currents $i2u'$, $i2v'$, and $i2w'$ used for current control, based on detection output from the failure detection apparatus 5, by a method different between when the sensor sections 21 of the current detection apparatus 2 can normally detect current and when failure has occurred.

First, in the case where all the sensor sections 21 of the current detection apparatus 2 can normally detect current, the motor currents detected by the sensor sections 21 are directly used as shown by the following expression.

$$i1u'=i1u$$

$$i1v'=i1v$$

$$i1w'=i1w$$

$$i2u'=i2u$$

$$i2v'=i2v$$

$$i2w'=i2w \qquad (2\text{-}1)$$

On the other hand, in the case where some of the sensor sections 21 of the current detection apparatus 2 have failed and the motor current for a certain phase of one winding group cannot be detected, instead of using this motor current, the motor current for this phase of the other winding group for which current is normally detected is used to perform the calculation. For example, in the case where the two motor currents $i1u$ and $i1v$ with respect to one winding group 11 cannot be detected because of failure of the sensor sections 21, the motor currents $i1u'$, $i1v'$, and $i1w'$ and the motor currents $i2u'$, $i2v'$, and $i2w'$ for the respective phases of the winding groups 11 and 12 are calculated by using the motor currents $i2u$ and $i2v$ for the same phases corresponding to the failure, detected by the sensor sections 21 with respect to the other winding group 12, as shown by the following expression.

$$i1u'=i2u$$

$$i1v'=i2v$$

$$i1w'=i1w$$

$$i2u'=i2u$$

$$i2v'=i2v$$

$$i2w'=i2w \qquad (2\text{-}2)$$

As shown by the motor model of expression (1-1), when the same voltage is applied to the two winding groups 11 and 12 or the same current is applied to them, since currents detected with respect to the two winding groups 11 and 12 are equal to each other in the respective phases, the motor currents for the respective phases of the other winding group detected by the normal sensor sections 21 can be used instead of the motor currents detected by the failed sensor sections 21, as shown by expression (2-2). Therefore, it is possible to continue to drive the multiplex-winding motor 1 while calculating the motor currents even when some of the sensor sections 21 have failed.

As described above, according to the second embodiment, in the case where some of the sensor sections 21 of the current detection apparatus 2 have failed and the motor currents of one of the two winding groups 11 and 12 cannot be accurately detected, voltage instructions for the respective phases of each of the winding groups 11 and 12 are calculated based on the motor currents of the other winding group for which current is normally detected, thereby continuing to drive the multiplex-winding motor 1, thus providing non-conventional effect of suppressing variation in the output characteristics of the multiplex-winding motor 1.

In addition, in conventional techniques, in the case where currents flowing in the windings for two or more phases included in one of the winding groups 11 and 12 cannot be detected because of failure of the sensor sections 21 of the current detection apparatus 2, the motor currents cannot be calculated, and instead, voltage instructions are obtained by using a torque instruction and a rotation angle velocity of the motor. Therefore, it is impossible to continue to drive the motor with excellent control responsiveness. On the other hand, in the second embodiment, even in the case where currents flowing in the windings for two or more phases included in one of the winding groups 11 and 12 cannot be detected because of failure of the current detection apparatus 2, if currents flowing in the other winding group can be detected, the motor currents for the respective phases are calculated by using the detected currents. Therefore, non-conventional effect of continuing to drive the multiplex-winding motor 1 with excellent control responsiveness is provided.

Third Embodiment

Figure 3:
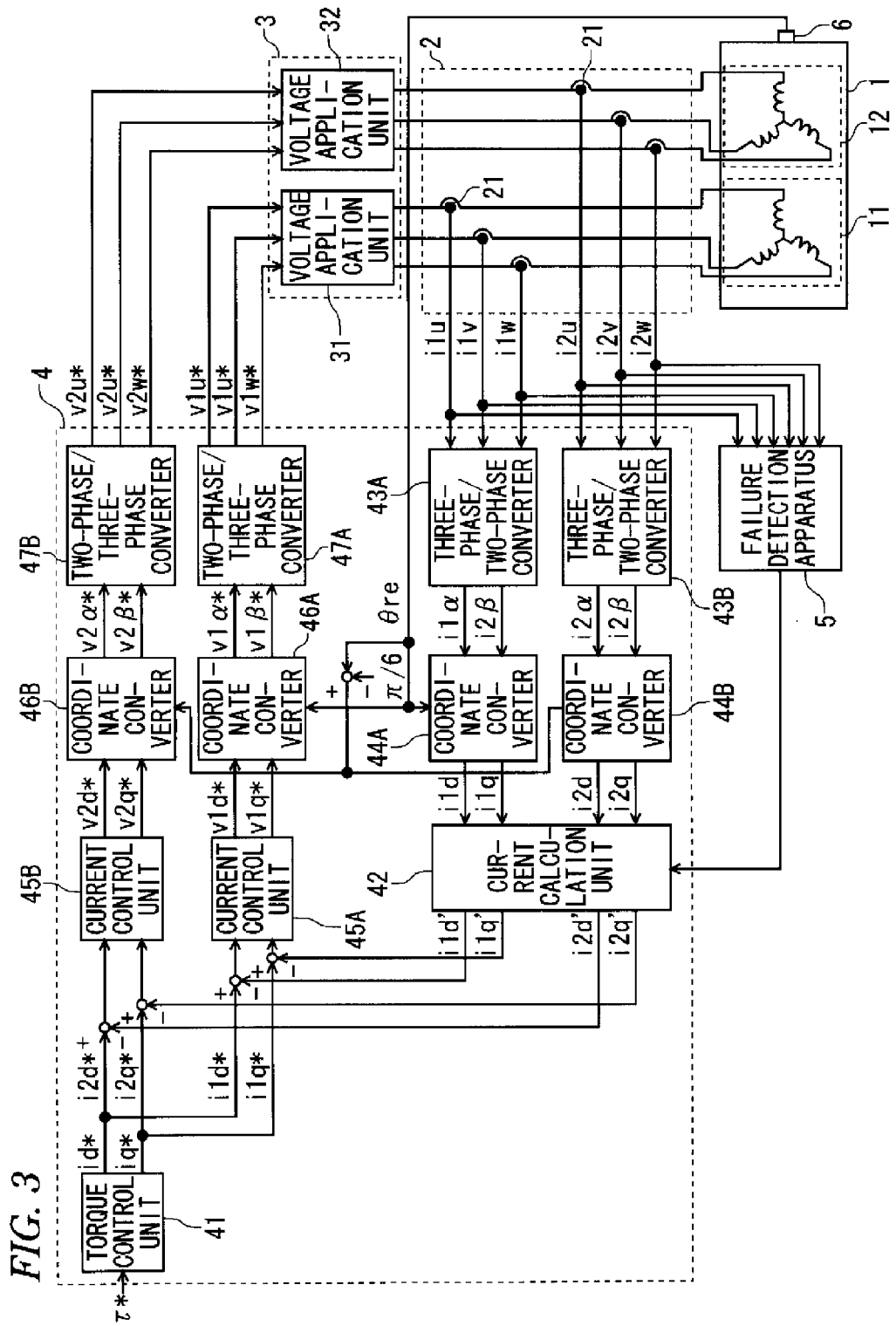
FIG. 3 is a configuration diagram of a driving apparatus for a multiplex-winding motor according to the third embodiment of the present invention.

FIG. 3 is a configuration diagram of a driving apparatus for a multiplex-winding motor according to the third embodiment. Components that correspond to or are the same as those of the second embodiment (FIG. 2) are denoted by the same reference numerals.

In the third embodiment, the multiplex-winding motor 1 and the control apparatus 4 are different from those of the second embodiment. That is, in the third embodiment, the first winding group 11 and the second winding group 12 have a phase difference therebetween. Here, as an example, the phase difference of the first winding group 11 from the second winding group 12 is set at π/6. In addition, in the control apparatus 4, unlike the second embodiment, the current calculation unit 42 for coping with the case where each sensor section 21 of the current detection apparatus 2 has failed is provided on the output side of coordinate converters 44A and 44B.

The motor model of the multiplex-winding motor 1 is represented by the following expression in a rotational coordinate system synchronized with the magnetic pole position θre of the motor. It is noted that regarding the second winding group 12, conversion to a rotational coordinate system having a phase difference of π/6 from that for the first winding group 11 is performed.

$$\begin{bmatrix} v1d \\ v1q \\ v2d \\ v2q \end{bmatrix} = R \begin{bmatrix} i1d \\ i1q \\ i2d \\ i2q \end{bmatrix} + \begin{bmatrix} PL_{11} & -\omega_{re}L_{11} & PM_{12} & -\omega_{re}M_{12} \\ \omega_{re}L_{11} & PL_{11} & \omega_{re}M_{12} & PM_{12} \\ PM_{12} & -\omega_{re}M_{12} & PL_{11} & -\omega_{re}L_{11} \\ \omega_{re}M_{12} & PM_{12} & \omega_{re}L_{11} & PL_{11} \end{bmatrix} \begin{bmatrix} i1d \\ i1q \\ i2d \\ i2q \end{bmatrix} + \omega_{re}\phi \begin{bmatrix} 0 \\ 1 \\ 0 \\ 1 \end{bmatrix} \quad (3\text{-}1)$$

Here, P is a differential operator, v1$d$ is a rotational coordinate system d-axis component of the first winding group voltage, v1$q$ is a rotational coordinate system q-axis component of the first winding group voltage, v2$d$ is a rotational coordinate system d-axis component of the second winding group voltage, v2$q$ is a rotational coordinate system q-axis component of the second winding group voltage, i1$d$ is a rotational coordinate system d-axis component of the first winding group current, i1$q$ is a rotational coordinate system q-axis component of the first winding group current, i2$d$ is a rotational coordinate system d-axis component of the second winding group current, i2$q$ is a rotational coordinate system q-axis component of the second winding group current (a rotational coordinate system for the second winding group has a phase advanced by π/6 from that for the first winding group), R is winding resistance, $L_1$ is winding self-inductance, $M_{12}$ is mutual inductance (between different winding groups), Φ is magnetic flux, and $\omega_{re}$ is rotation angle velocity (electric angle).

The motor model of expression (3-1) is equal to that of expression (1-1), except that values with respect to the second winding group 12 are in a rotational coordinate system having a phase difference of π/6 from that for the first winding group 11. Therefore, except that the two winding groups 11 and 12 have a phase difference therebetween, in other words, in rotational coordinate systems having a phase difference of π/6 therebetween, when the same voltage is applied to the two winding groups 11 and 12, currents flowing in the winding groups 11 and 12 are equal to each other in the respective phases, and when the same current is applied to the winding groups 11 and 12 in the respective phases, voltages applied to the winding groups 11 and 12 are equal to each other.

The control apparatus 4 performs the same current control as in the second embodiment, to generate the voltage instructions v1$u$*, v1$v$*, and v1$w$* and the voltage instructions v2$u$*, v2$v$*, and v2$w$* with respect to the two winding groups 11 and 12, and gives the voltage instructions v1$u$*, v1$v$*, and v1$w$* to one voltage application unit 31 of the voltage application apparatus 3, and the voltage instructions v2$u$*, v2$v$*, and v2$w$* to the other voltage application unit 32, thereby performing motor driving control for each of the winding groups 11 and 12 individually.

In this case, the current calculation unit 42 calculates motor currents i1$d$', i1$q$', i2$d$', and i2$q$' in a rotational coordinate system synchronized with the magnetic pole position θre of the motor which are used for current control, based on detection output from the failure detection apparatus 5, by a method different between when the sensor sections 21 of the current detection apparatus 2 can normally detect current and when failure has occurred.

First, in the case where all the sensor sections 21 of the current detection apparatus 2 can normally detect current, the motor currents obtained through coordinate conversion to a rotational coordinate system based on the motor currents detected by the sensor sections 21 are directly used as shown by the following expression.

i1$d$'=i1$d$ i1$q$'=i1$q$ i2$d$'=i2$d$ i2$q$'=i2$q$ (3-2)

On the other hand, in the case where some of the sensor sections 21 of the current detection apparatus 2 have failed and the motor currents with respect to one winding group cannot be detected, instead of using these motor currents, the motor currents in a rotational coordinate system obtained by using the motor currents with respect to the other winding group for which current is normally detected are used. For example, in the case where the motor currents i1u and i1v for two phases with respect to one winding group 11 cannot be detected because of failure of the sensor sections 21, the motor currents i1d' and i1q' and the motor currents i2d' and i2q' in a rotational coordinate system are calculated by using the motor currents i2d and i2q in a rotational coordinate system outputted from the coordinate converter 44B, as shown by the following expression.

$$i1d'=i2d$$

$$i1q'=i2q$$

$$i2d'=i2d$$

$$i2q'=i2q \quad (3\text{-}3)$$

As shown by the motor model of expression (3-1), except that the two winding groups 11 and 12 have a phase difference therebetween, in other words, in rotational coordinate systems having a phase difference of π/6 therebetween, when the same voltage is applied to the two winding groups 11 and 12 or the same current is applied to them, currents flowing in the two winding groups 11 and 12 are equal to each other in the respective phases. Therefore, as shown by expression (3-3), instead of using currents in a rotational coordinate system detected by the failed sensor sections 21, currents in a rotational coordinate system obtained based on the motor currents for the respective phases of the other winding group detected by the normal sensor sections 21 can be used. Therefore, even when some of the sensor sections 21 have failed, it is possible to continue to drive the multiplex-winding motor 1 while calculating the motor currents.

As described above, according to the third embodiment, in addition to the effect of the second embodiment, in the case where a plurality of winding groups 11 and 12 have a phase difference therebetween, even when some of the sensor sections 21 of the current detection apparatus 2 have failed and the motor currents in a rotational coordinate system for one of the two winding groups 11 and 12 cannot be accurately detected, voltage instructions are calculated based on the motor currents in a rotational coordinate system with respect to the other winding group for which current is normally detected, thereby continuing to drive the multiplex-winding motor 1. Therefore, non-conventional effect of suppressing variation in the output characteristics of the multiplex-winding motor 1 is provided.

Fourth Embodiment

Figure 4:
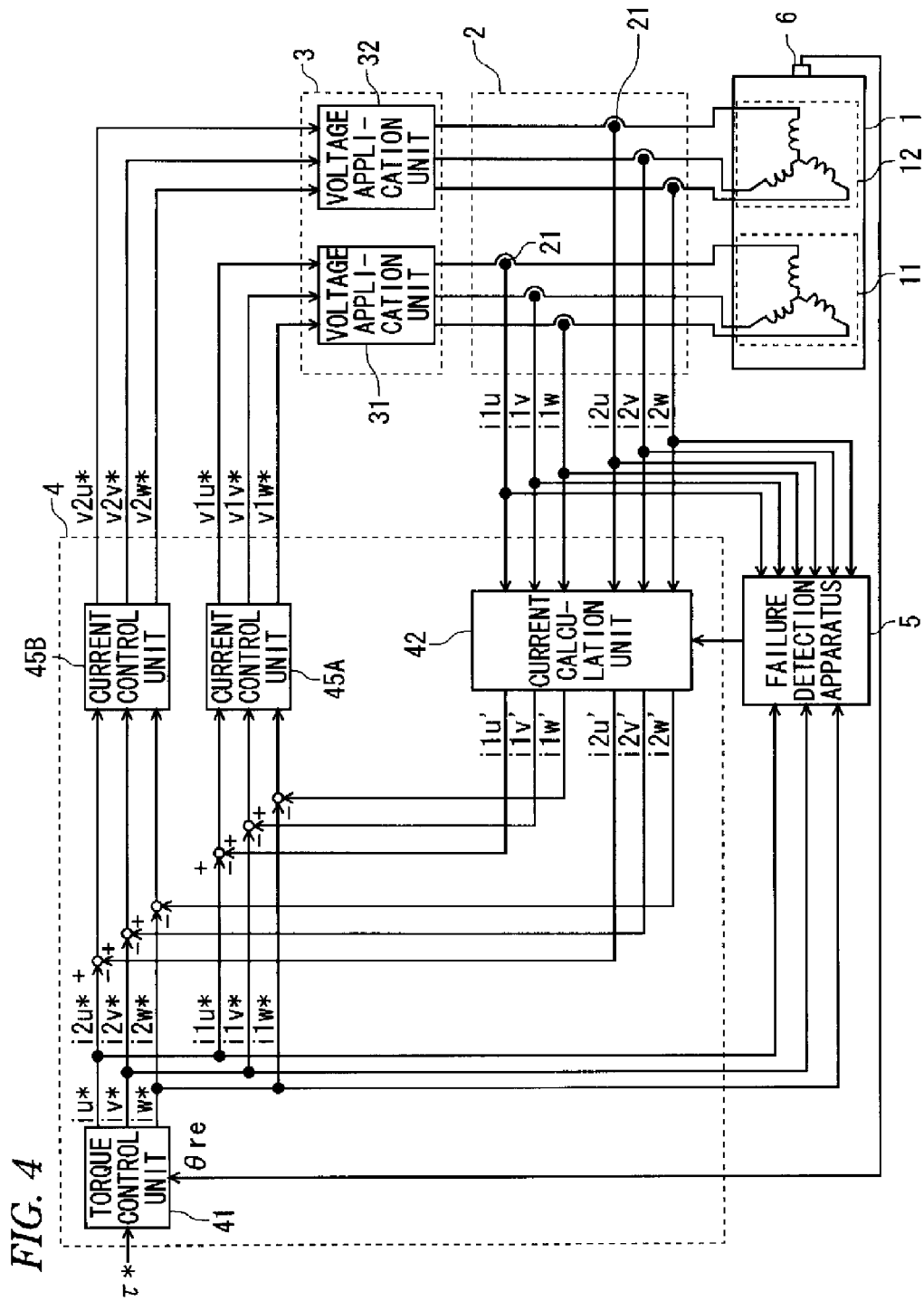
FIG. 4 is a configuration diagram of a driving apparatus for a multiplex-winding motor according to the fourth embodiment of the present invention.

FIG. 4 is a configuration diagram of a driving apparatus for a multiplex-winding motor according to the fourth embodiment of the present invention. Components that correspond to or are the same as those of the second embodiment (FIG. 2) are denoted by the same reference numerals.

In the fourth embodiment, the control apparatus 4 and the failure detection apparatus 5 are different from those of the second embodiment. That is, in the fourth embodiment, by using the fact that when the current detection apparatus 2 is normal, the current instructions i1u*, i1v*, and i1w* and the current instructions i2u*, i2v*, and i2w* for the winding groups 11 and 12 outputted from the torque control unit 41 are, by current control, equal to the currents i1u, i1v, and i1w and the currents i2u, i2v, and i2w detected by the sensor sections 21 of the current detection apparatus 2, if the difference between the current instruction and the detected current is larger than a predetermined threshold value, the failure detection apparatus 5 determines that the detection function for the phase of the winding group corresponding to such a sensor section 21 of the current detection apparatus 2 has failed.

The control apparatus 4 performs the same control as that by the control apparatus 4 of the second embodiment, in each of three-phase coordinate systems corresponding to the winding groups 11 and 12. A feature of the fourth embodiment is that the current calculation unit 42 for coping with the case where each sensor section 21 of the current detection apparatus 2 has failed is provided in the control apparatus 4.

Specifically, the torque control unit 41 generates current instructions iu*, iv*, and iw* in a three-phase coordinate system, in accordance with a desired driving condition of the motor such as rotation rate or torque, here, from the torque instruction τ*, based on the magnetic pole position θre of the motor.

Then, each of the above current instructions is divided into two current instructions, to obtain the current instructions i1u*, i1v*, and i1w* and the current instructions i2u*, i2v*, and i2w* for the two winding groups 11 and 12. The current control units 45A and 45B respectively perform, for example, proportional integral control for the difference between the current instructions i1u*, i1v*, and i1w* and the motor currents i1u', i1v', and i1w' used in current control, and the difference between the current instructions i2u*, i2v*, and i2w* and the motor currents i2u', i2v', and i2w' used in current control, thereby generating the voltage instructions v1u*, v1v*, and v1w* and the voltage instructions v2u*, v2v*, and v2w* for the two winding groups 11 and 12.

On the other hand, the current calculation unit 42 calculates the motor currents i1u', i1v', and i1w' and the motor currents i2u', i2v', and i2w' used in current control, based on detection output from the failure detection apparatus 5, by a method different between when the sensor sections 21 of the current detection apparatus 2 can normally detect current and when failure has occurred.

First, in the case where all the sensor sections 21 of the current detection apparatus 2 can normally detect current, the currents detected by the sensor sections 21 are directly used as shown by the following expression.

$$i1u'=i1u$$

$$i1v'=i1v$$

$$i1w'=i1w$$

$$i2u'=i2u$$

$$i2v'=i2v$$

$$i2w'=i2w \quad (4\text{-}1)$$

On the other hand, in the case where some of the sensor sections 21 of the current detection apparatus 2 have failed and currents of one winding group cannot be detected, instead of using these currents, the motor currents for the respective phases of the other winding group for which current is normally detected are used to perform calculation as described below.

As described in the second embodiment, when the same voltage is applied to the two winding groups 11 and 12 or the same current is applied to them, currents of the two winding groups 11 and 12 are equal to each other in the respective phases as shown by the motor model of expression (1-1), and therefore, when the motor currents for the respective phases of one winding group cannot be accurately obtained because of failure of some of the sensor sections 21 of the current detection apparatus 2, the motor currents of the other winding group for which current is normally detected can be used, as shown by expression (2-2). However, since there is variation in the circuit constant of the multiplex-winding motor 1, the characteristics of the voltage application apparatus 3, or the like, the current values of the plurality of winding groups 11 and 12 are not accurately equal to each other in the respective phases.

Accordingly, in the fourth embodiment, in the case where the motor currents with respect to one winding group are not accurately obtained and the motor currents with respect to the other winding group for which current is normally detected are used to perform the calculation, if not all the sensor sections 21 with respect to the one winding group have failed and at least the sensor section 21 for one phase can normally detect the motor current for the one phase, the values of the motor currents for the phases corresponding to the failure are corrected by using both the motor current detected by the sensor section 21 for the one phase for which current can be normally detected, and the motor current for the one phase of the other winding group for which current is normally detected.

For example, in the case where the motor currents i1$u$ and i1$v$ for two phases of one winding group 11 cannot be detected because of failure of the sensor sections 21 but the motor current i1$w$ for the other phase of the winding group 11 can be normally detected, the motor currents i1$u'$, i1$v'$, and i1$w'$ and the motor currents i2$u'$, i2$v'$, and i2$w'$ for the respective phases used for current control are calculated as shown by the following expression.

$$k1 = i1w/i2w$$

$$i1u' = k1 \times i2u$$

$$i1v' = k1 \times i2v$$

$$i1w' = i1w$$

$$i1u' = i2u$$

$$i2v' = i2v$$

$$i2w' = i2w \quad (4\text{-}2)$$

Thus, in expression (4-2), in the case where the motor currents with respect to one winding group are not accurately obtained and the calculation is performed by using the motor currents with respect to the other winding group for which current is normally detected, if, of the sensor sections 21 for the one winding group, at least the sensor section 21 for one phase can normally detect the motor current for the one phase, correction is performed by using k1 which is the ratio between the motor current for the one phase that is normally detected and the motor current of the other winding group detected for the one phase. Therefore, when there is variation in the circuit constant of the motor, the characteristics of the voltage application apparatus, or the like, it is possible to calculate more accurately the motor current for the failed phase.

As described above, according to the fourth embodiment, in addition to the effect of the second embodiment, even when some of the sensor sections 21 for one winding group have failed, if at least the other sensor section 21 for one phase can normally detect the motor current flowing in the winding for the one phase, correction is performed by using k1 which is the ratio between the motor current for the one phase that is normally detected and the motor current of the other winding group detected for the one phase. Therefore, non-conventional effect is provided that, even when there is variation in the circuit constant of the multiplex-winding motor 1, the characteristics of the voltage application apparatus 3, or the like, the motor current for the failed phase can be calculated more accurately.

Fifth Embodiment

Figure 5:
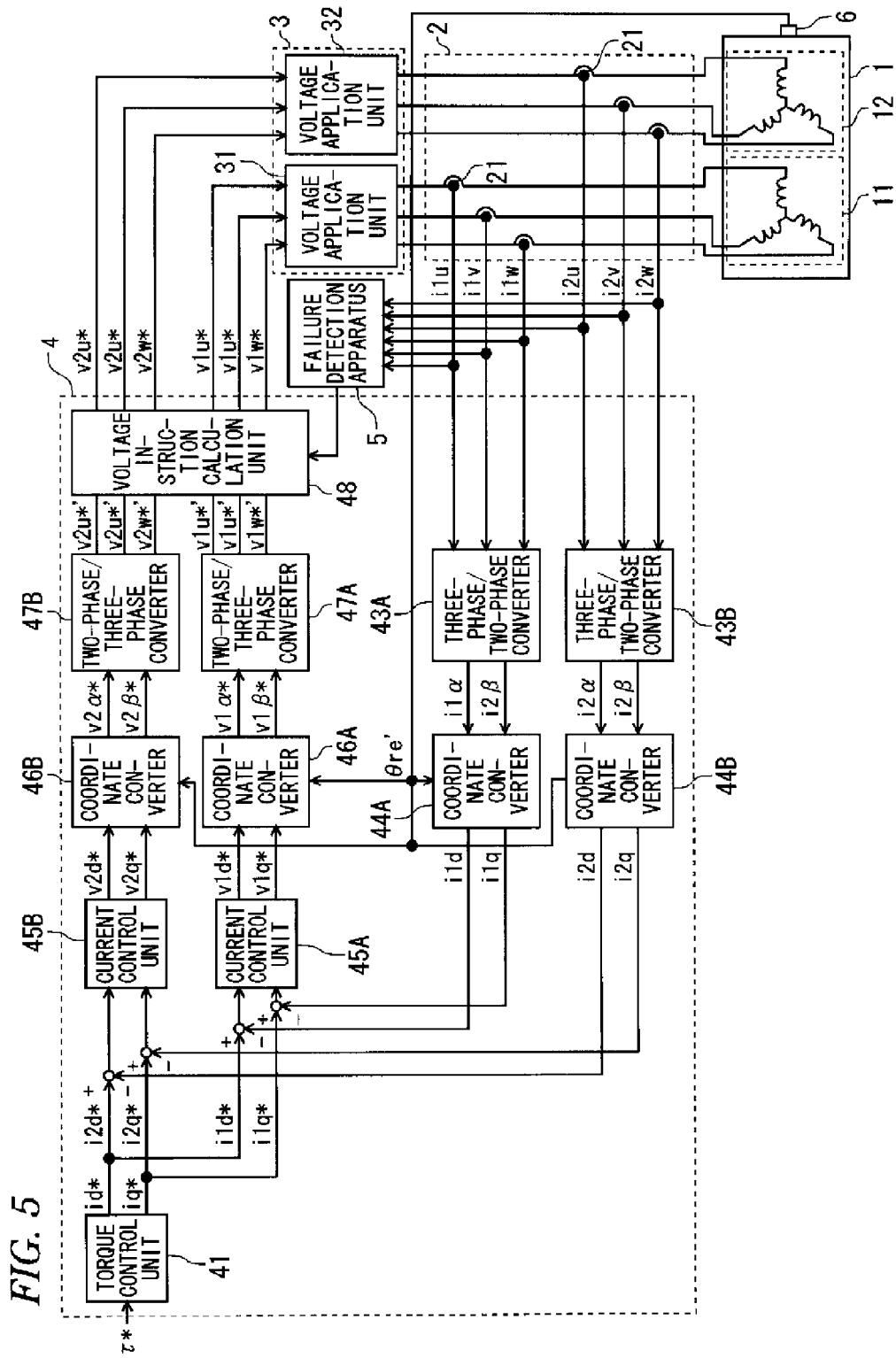
FIG. 5 is a configuration diagram of a driving apparatus for a multiplex-winding motor according to the fifth embodiment of the present invention.

FIG. 5 is a configuration diagram of a driving apparatus for a multiplex-winding motor according to the fifth embodiment of the present invention. Components that correspond to or are the same as those of the second embodiment (FIG. 2) are denoted by the same reference numerals.

In the fifth embodiment, the multiplex-winding motor 1 and the control apparatus 4 are different from those of the second embodiment. That is, in the fifth embodiment, the multiplex-winding motor 1 is an induction motor having the two winding groups 11 and 12 each composed of three-phase windings, provided for a stator, the first winding group 11 and the second winding group 12 having no phase difference therebetween. In addition, in the control apparatus 4, a voltage instruction calculation unit 48 for coping with failure of the sensor sections 21 of the current detection apparatus 2 is provided on the output side of two-phase/three-phase converters 47A and 47B.

The motor model of the multiplex-winding motor 1 is represented by the following expression in a rotational coordinate system synchronized with a magnetic flux position $\theta re'$ of the motor.

$$\begin{bmatrix} v1d \\ v1q \\ v2d \\ v2q \\ 0 \\ 0 \end{bmatrix} = \begin{bmatrix} R_a + PL_{11} & -\omega_1 L_{11} & PM_{12} & -\omega_1 M_{12} & PM_r & -\omega_1 M_r \\ \omega_1 L_{11} & R_a + PL_{11} & \omega_1 M_{12} & PM_{12} & \omega_1 M_r & PM_r \\ PM_{12} & -\omega_1 M_{12} & R_a + PL_{11} & -\omega_1 L_{11} & PM_r & -\omega_1 M_r \\ \omega_1 M_{12} & PM_{12} & \omega_1 L_{11} & R_a + PL_{11} & \omega_1 M_r & PM_r \\ PM_r & -(\omega - \omega_{re})M_r & PM_r & -(\omega_1 - \omega_{re})M_r & R_r + PL_r & -(\omega_1 - \omega_{re})L_r \\ (\omega_1 - \omega_{re})M_r & PM_r & (\omega_1 - \omega_{re})M_r & PM_r & (\omega_1 - \omega_{re})L_r & R_r + PL_r \end{bmatrix} \begin{bmatrix} i1d \\ i1q \\ i2d \\ i2q \\ idr \\ iqr \end{bmatrix} \quad (5\text{-}1)$$

Here, P is a differential operator, $v1d$ is a rotational coordinate system d-axis component of the first winding group voltage, $v1q$ is a rotational coordinate system q-axis component of the first winding group voltage, $v2d$ is a rotational coordinate system d-axis component of the second winding group voltage, $v2q$ is a rotational coordinate system q-axis component of the second winding group voltage, $i1d$ is a rotational coordinate system d-axis component of the first winding group current, $i1q$ is a rotational coordinate system q-axis component of the first winding group current, $i2d$ is a rotational coordinate system d-axis component of the second winding group current, $i2q$ is a rotational coordinate system q-axis component of the second winding group current, idr is a rotational coordinate system d-axis component of the rotor current, iqr is a rotational coordinate system q-axis component of the rotor current, $R_a$ is stator winding resistance, $L_{11}$ is stator winding self-inductance $M_{12}$ is mutual inductance (between different stator winding groups), $R_r$ is rotor winding resistance, $L_r$ is rotor winding self-inductance, $M_r$ is mutual inductance (between stator winding and rotor winding), $\omega_{re}$ is rotation angle velocity (electric angle), and $\omega_1$ is a primary angle frequency.

According to the above motor model, when the same voltage is applied to the two winding groups 11 and 12, currents flowing in the winding groups 11 and 12 are equal to each other in the respective phases, and when the same current is applied to the three-phase windings of the winding groups 11 and 12, voltages applied to the winding groups 11 and 12 are equal to each other.

The control apparatus 4 performs the same current control as in the second embodiment, based on the magnetic flux position θre' of the motor and the currents detected by the sensor sections 21 of the current detection apparatus 2, thereby generating the voltage instructions $v1u^*$, $v1v^*$, and $v1w^*$ and the voltage instructions $v2u^*$, $v2v^*$, and $v2w^*$ with respect to the two winding groups 11 and 12.

The voltage instruction calculation unit 48 calculates the voltage instructions $v1u^*$, $v1v^*$, and $v1w^*$ and the voltage instructions $v2u^*$, $v2v^*$, and $v2w^*$ with respect to the winding groups 11 and 12, based on detection output from the failure detection apparatus 5, by a method different between when the sensor sections 21 of the current detection apparatus 2 can normally detect current and when failure has occurred.

First, in the case where all the sensor sections 21 of the current detection apparatus 2 can normally detect current, control output voltage instructions outputted from the two-phase/three-phase converters 47A and 47B are directly used as voltage instructions with respect to the winding groups 11 and 12, as shown by the following expression.

$$v1u^* = v1u^{*\prime}$$

$$v1v^* = v1v^{*\prime}$$

$$v1w^* = v1w^{*\prime}$$

$$v2u^* = v2u^{*\prime}$$

$$v2v^* = v2v^{*\prime}$$

$$v2w^* = v2w^{*\prime} \quad (5\text{-}2)$$

On the other hand, in the case where some of the sensor sections 21 of the current detection apparatus 2 have failed and the motor currents for one winding group cannot be detected, instead of using these motor currents, the calculation is performed such that control output voltage instructions generated by the two-phase/three-phase converters 47A or 47B based on the motor currents for the respective phases of the other winding group that are normally detected are used as voltage instructions. For example, in the case where the two motor currents i1u and i1v of one winding group 11 cannot be detected because of failure of the sensor sections 21, voltage instructions with respect to the winding groups 11 and 12 are calculated by using control output voltage instructions $v2u^{*\prime}$ and $v2v^{*\prime}$ for the same phases corresponding to the failure, generated by the two-phase/three-phase converter 47B for the other winding group 12, as shown by the following expression.

$$v1u^* = v2u^{*\prime}$$

$$v1v^* = v2v^{*\prime}$$

$$v1w^* = v1w^{*\prime}$$

$$v2u^* = v2u^{*\prime}$$

$$v2v^* = v2v^{*\prime}$$

$$v2w^* = v2w^* \quad (5\text{-}3)$$

As shown by the motor model of expression (5-1), when the same voltage is applied to the two winding groups 11 and 12 or the same current is applied to them, voltages of the two winding groups 11 and 12 are equal to each other. Therefore, as shown by expression (5-3), a voltage instruction obtained based on the motor current for each phase of the other winding group detected by the normal sensor section 21 can be used as a voltage instruction for the corresponding phase obtained based on current detected by the failed sensor section 21. Therefore, even when some of the sensor sections 21 have failed, it is possible to continue to drive the multiplex-winding motor 1 while calculating voltage instructions.

As described above, according to the fifth embodiment, in the case where some of the sensor sections 21 of the current detection apparatus 2 have failed and the motor currents of one of the two winding groups 11 and 12 cannot be accurately detected, voltage instructions for the respective phases of the winding groups 11 and 12 are calculated by using control output voltage instructions calculated based on the motor currents with respect to the other winding group that are normally detected, thereby continuing to drive the multiplex-winding motor 1, thus providing non-conventional effect of suppressing variation in the output characteristics of the multiplex-winding motor 1.

In addition, in conventional techniques, in the case where the motor currents flowing in the windings for two or more phases included in one of the winding groups 11 and 12 cannot be detected because of failure of the sensor sections 21 of the current detection apparatus 2, voltage instructions cannot be calculated, and instead, voltage instructions are obtained by using a torque instruction and a rotation angle velocity of the motor. Therefore, it is impossible to continue to drive the motor with excellent control responsiveness. On the other hand, in the fifth embodiment, even in the case where the motor currents flowing in the windings for two or more phases included in one of the winding groups 11 and 12 cannot be detected because of failure of the current detection apparatus 2, if the motor currents flowing in the other winding group can be detected, voltage instructions for the respective phases of the winding groups 11 and 12 are calculated by using control output voltage instructions calculated based on the motor currents of the other winding group that are normally detected, thereby performing current control. Therefore, non-conventional effect of continuing to drive the motor with excellent control responsiveness is provided.

Sixth Embodiment

Figure 6:
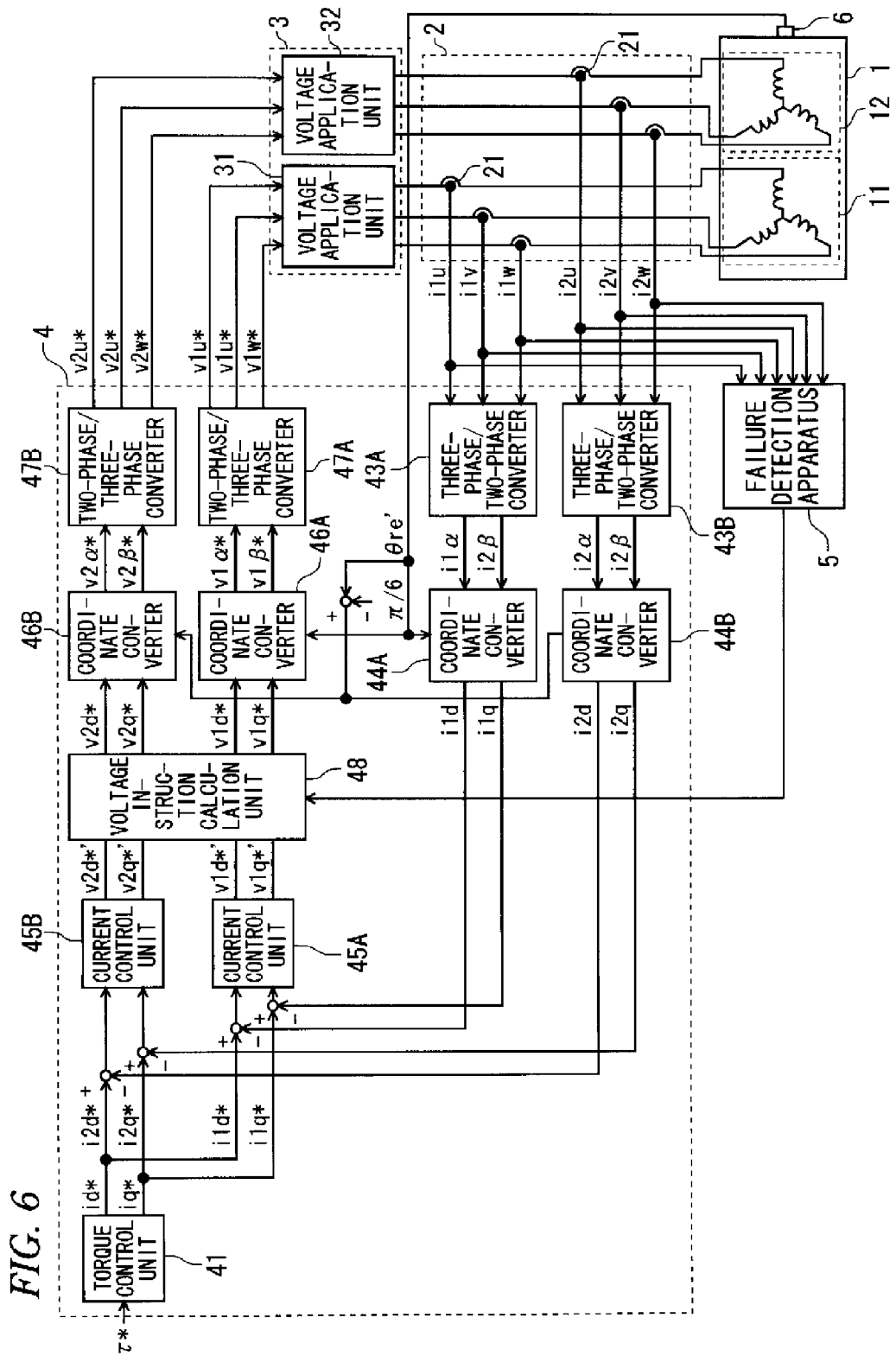
FIG. 6 is a configuration diagram of a driving apparatus for a multiplex-winding motor according to the sixth embodiment of the present invention.

FIG. 6 is a configuration diagram of a driving apparatus for a multiplex-winding motor according to the sixth embodiment of the present invention. Components that correspond to or are the same as those of the fifth embodiment (FIG. 5) are denoted by the same reference numerals.

In the sixth embodiment, the multiplex-winding motor 1 and the control apparatus 4 are different from those of the fifth embodiment. That is, the multiplex-winding motor 1 is an induction motor having two groups of three-phase windings provided for a stator, in which the first winding group 11 and the second winding group 12 have a phase difference therebetween. Here, as an example, the phase difference of the first winding group 11 from the second winding group 12 is set at π/6. In addition, in the control apparatus 4, the voltage instruction calculation unit 48 for coping with failure of the sensor sections 21 of the current detection apparatus 2 is provided on the output side of the current control units 45A and 45B.

The motor model of the multiplex-winding motor 1 is represented by the following expression in a rotational coordinate system synchronized with the magnetic flux position θre' of the motor. It is noted that regarding the second winding group 12, conversion to a rotational coordinate system having a phase difference of π/6 from that for the first winding group 11 is performed.

$$\begin{bmatrix} v1d \\ v1q \\ v2d \\ v2q \\ 0 \\ 0 \end{bmatrix} = \begin{bmatrix} R_a + PL_{11} & -\omega_1 L_{11} & PM_{12} & -\omega_1 M_{12} & PM_r & -\omega_1 M_r \\ \omega_1 L_{11} & R_a + PL_{11} & \omega_1 M_{12} & PM_{12} & \omega_1 M_r & PM_r \\ PM_{12} & -\omega_1 M_{12} & R_a + PL_{11} & -\omega_1 L_{11} & PM_r & -\omega_1 M_r \\ \omega_1 M_{12} & PM_{12} & \omega_1 L_{11} & R_a + PL_{11} & \omega_1 M_r & PM_r \\ PM_r & -(\omega - \omega_{re})M_r & PM_r & -(\omega_1 - \omega_{re})M_r & R_r + PL_r & -(\omega_1 - \omega_{re})L_r \\ (\omega_1 - \omega_{re})M_r & PM_r & (\omega_1 - \omega_{re})M_r & PM_r & (\omega_1 - \omega_{re})L_r & R_r + PL_r \end{bmatrix} \begin{bmatrix} i1d \\ i1q \\ i2d \\ i2q \\ idr \\ iqr \end{bmatrix}$$

(6-1)

Here, P is a differential operator, v1d is a rotational coordinate system d-axis component of the first winding group voltage, v1q is a rotational coordinate system q-axis component of the first winding group voltage, v2d is a rotational coordinate system d-axis component of the second winding group voltage, v2q is a rotational coordinate system q-axis component of the second winding group voltage, i1d is a rotational coordinate system d-axis component of the first winding group current, i1q is a rotational coordinate system q-axis component of the first winding group current, i2d is a rotational coordinate system d-axis component of the second winding group current, i2q is a rotational coordinate system q-axis component of the second winding group current, idr is a rotational coordinate system d-axis component of the rotor current, iqr is a rotational coordinate system q-axis component of the rotor current (the phase of the rotational coordinate system for the second winding group is advanced from that for the first winding group by π/6), $R_a$ is stator winding resistance, $L_{11}$ is stator winding self-inductance, $M_{12}$ is mutual inductance (between different stator winding groups), $R_r$ is rotor winding resistance, $L_r$ is rotor winding self-inductance, $M_r$ is mutual inductance (between stator winding and rotor winding), $\omega_{re}$ is rotation angle velocity (electric angle), and $\omega_1$ is primary angle frequency.

The motor model of expression (6-1) is equal to that of expression (5-1), except that values with respect to the second winding group 12 are in a rotational coordinate system having a phase difference of π/6 from that for the first winding group 11. Therefore, except that the two winding groups 11 and 12 have a phase difference therebetween, in other words, in rotational coordinate systems having a phase difference of π/6 therebetween, when the same voltage is applied to the two winding groups 11 and 12, currents flowing in the winding groups 11 and 12 are equal to each other in the respective phases, and when the same current is applied to the winding groups 11 and 12 in the respective phases, voltages applied to the winding groups 11 and 12 are equal to each other.

The control apparatus 4 performs the same current control as in the fifth embodiment, to generate the voltage instructions v1u*, v1v*, and v1w* and the voltage instructions v2u*, v2v*, and v2w* with respect to the two winding groups 11 and 12. The voltage instruction calculation unit 48 calculates the voltage instructions v1d*, v1q*, v2d*, and v2q* in a rotational coordinate system synchronized with the magnetic pole position θre' of the multiplex-winding motor 1, based on detection output from the failure detection apparatus 5, by a method different between when the sensor sections 21 of the current detection apparatus 2 can normally detect current and when failure has occurred.

First, in the case where all the sensor sections 21 of the current detection apparatus 2 can normally detect current, voltage instructions v1d*', v1q*', v2d*', and v2q*' in a rotational coordinate system obtained through current control by the current control units 45A and 45B are directly used as shown by the following expression.

$$v1d^* = v1d^{*\prime}$$

$$v1q^* = v1q^{*\prime}$$

$$v2d^* = v2d^{*\prime}$$

$$v2q^* = v2q^{*\prime} \tag{6-2}$$

On the other hand, in the case where some of the sensor sections 21 of the current detection apparatus 2 have failed and the motor currents with respect to one winding group cannot be detected, instead of using these motor currents, voltages in a rotational coordinate system obtained by using the motor currents with respect to the other winding group that are normally detected are used. For example, in the case where the motor currents i1u and i1v for two phases of one winding group 11 cannot be detected because of failure of the sensor sections 21, the voltage instructions v1d* and v1q* and the voltage instructions v2d* and v2q* in a rotational coordinate system are calculated by using the voltages v2d*' and v2q*' in a rotational coordinate system outputted from the current control unit 45B, as shown by the following expression.

$$v1d^* = v2d^{*\prime}$$

$$v1q^* = v2q^{*\prime}$$

$$v2d^* = v2d^{*\prime}$$

$$v2q^* = v2q^* \quad (6\text{-}3)$$

As shown by the motor model of expression (6-1), except that the two winding groups 11 and 12 have a phase difference therebetween, in other words, in rotational coordinate systems having a phase difference of π/6 therebetween, when the same voltage is applied to the two winding groups 11 and 12 or the same current is applied to them, voltages of the two winding groups 11 and 12 are equal to each other. Therefore, as shown by expression (6-3), instead of using voltage instructions in a rotational coordinate system obtained based on detection by the failed sensor section 21, voltage instructions in a rotational coordinate system obtained based on the motor currents for the respective phases of the other winding group detected by the normal sensor sections 21 can be used. Therefore, even when some of the sensor sections 21 have failed, it is possible to continue to drive the multiplex-winding motor 1 while calculating the voltage instructions.

As described above, according to the sixth embodiment, in addition to the effect of the fifth embodiment, in the case where a plurality of winding groups 11 and 12 have a phase difference therebetween, even when some of the sensor sections 21 of the current detection apparatus 2 have failed and voltage instructions in a rotational coordinate system for one of the two winding groups 11 and 12 cannot be accurately obtained, the voltage instructions are calculated based on voltage instructions in a rotational coordinate system obtained from the motor currents with respect to the other winding group that are normally detected, thereby continuing to drive the multiplex-winding motor 1. Therefore, non-conventional effect of suppressing variation in the output characteristics of the multiplex-winding motor 1 is provided.

Seventh Embodiment

Figure 7:
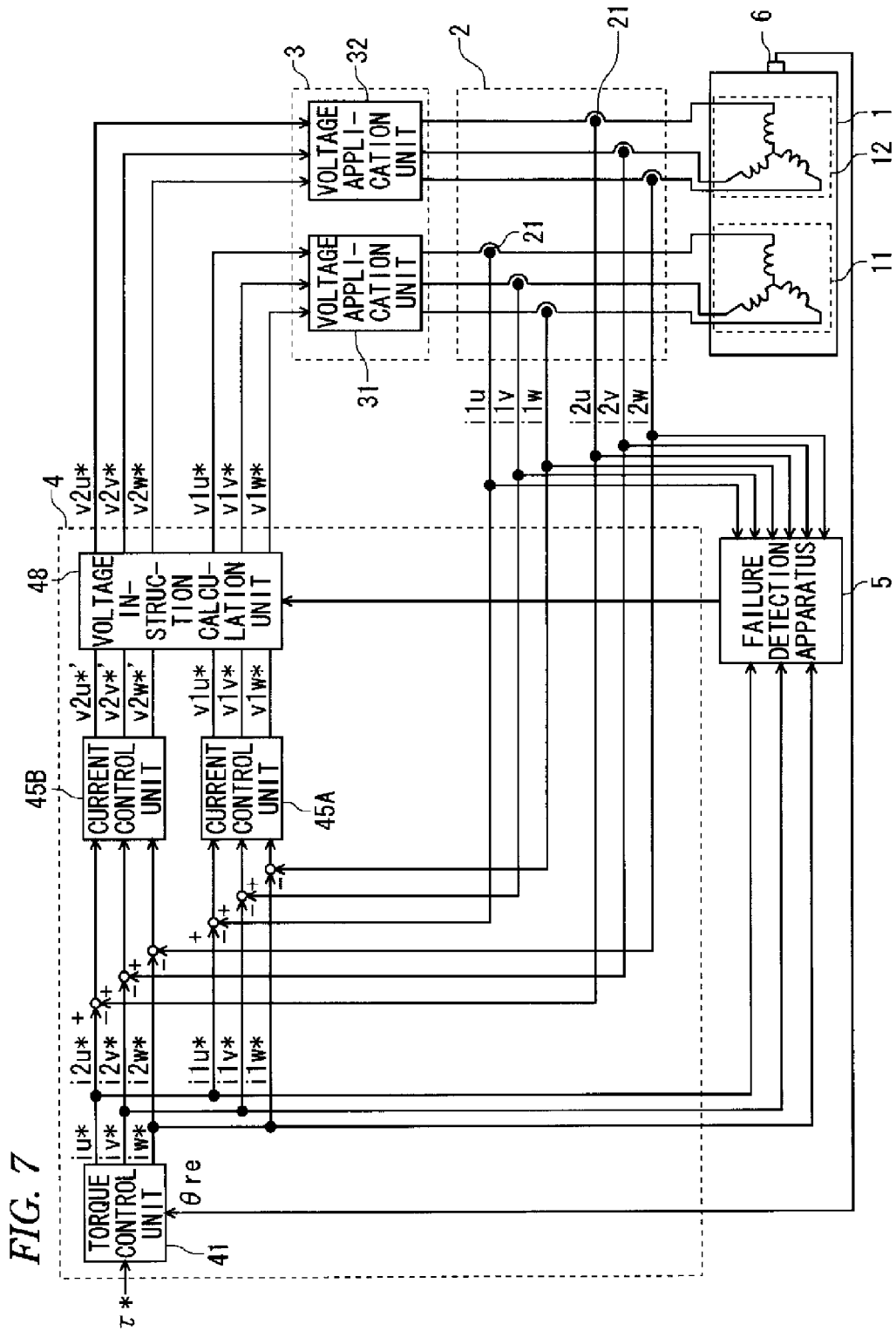
FIG. 7 is a configuration diagram of a driving apparatus for a multiplex-winding motor according to the seventh embodiment of the present invention.

FIG. 7 is a configuration diagram of a driving apparatus for a multiplex-winding motor according to the seventh embodiment of the present invention. Components that correspond to or are the same as those of the fifth embodiment (FIG. 5) are denoted by the same reference numerals.

In the seventh embodiment, the control apparatus 4 and the failure detection apparatus 5 are different from those of the fifth embodiment. That is, the failure detection apparatus 5 detects failure of the current detection apparatus 2, in the same manner as described in the fourth embodiment. In addition, in the control apparatus 4, the voltage instruction calculation unit 48 for coping with failure of the sensor sections 21 of the current detection apparatus 2 is provided on the output side of the current control units 45A and 45B.

The current control units 45A and 45B of the control apparatus 4 generate voltage instructions v1u*', v1v*', and v1w*' and voltage instructions v2u*', v2v*', and v2w*' for the winding groups 11 and 12, respectively, in the same manner as described in the fourth embodiment.

The voltage instruction calculation unit 48 calculates the voltage instructions v1u*, v1v*, and v1w* and the voltage instructions v2u*, v2v*, and v2w* for the two winding groups 11 and 12, based on detection output from the failure detection apparatus 5, by a method different between when the sensor sections 21 of the current detection apparatus 2 can normally detect current and when failure has occurred.

First, in the case where all the sensor sections 21 of the current detection apparatus 2 can normally detect current, the control output voltage instructions v1u*', v1v*', and v1w*' and the control output voltage instructions v2u*', v2v*', and v2w*' obtained through current control, which are outputted from the current control units 45A and 45B, are directly used, as shown by the following expression.

$$v1u^* = v1u^{*\prime}$$

$$v1v^* = v1v^{*\prime}$$

$$v1w^* = v1w^{*\prime}$$

$$v2u^* = v2u^{*\prime}$$

$$v2v^* = v2v^{*\prime}$$

$$v2w^* = v2w^{*\prime} \quad (7\text{-}1)$$

On the other hand, in the case where some of the sensor sections 21 of the current detection apparatus 2 have failed and the motor currents of one winding group cannot be detected, instead of using these motor currents, control output voltage instructions obtained based on the motor currents for the respective phases of the other winding group that are normally detected are used to perform calculation as described below.

As described in the fifth embodiment, when the same voltage is applied to the two winding groups 11 and 12 or the same current is applied to them, voltages of the two winding groups 11 and 12 are equal to each other as shown by the motor model of expression (5-1), and therefore, when voltage instructions for the respective phases of one winding group cannot be accurately obtained because of failure of some of the sensor sections 21 of the current detection apparatus 2, voltage instructions obtained based on currents of the other winding group for which current is normally detected can be used, as shown by expression (5-3). However, since there is variation in the circuit constant of the multiplex-winding motor 1, the characteristics of the voltage application apparatus 3, or the like, voltage instructions for the plurality of winding groups 11 and 12 are not accurately equal to each other in the respective phases.

Accordingly, in the seventh embodiment, in the case where voltage instructions for one winding group are not accurately obtained and voltage instructions obtained from the motor currents of the other winding group that are normally detected are used to perform the calculation, if not all the sensor sections 21 with respect to one winding group have failed and at least the sensor section 21 for one phase can normally detect the motor current for the one phase, the voltage instructions for the phases corresponding to the failure are corrected by using both the control output voltage instruction obtained based on the motor current detected by the sensor section 21 for the one phase for which current can be normally detected, and the control output voltage instruction obtained based on the motor current for the one phase of the other winding group that is normally detected.

For example, in the case where the two motor currents i1u and i1v of one winding group 11 cannot be detected because of failure of the sensor sections 21 but the motor current i1w for the other phase of the winding group 11 can be normally detected, the voltage instructions v1u*, v1v*, and v1w* and the voltage instructions v2u*, v2v*, and v2w* for the respective phases with respect to the winding groups 11 and 12 are calculated as shown by the following expression.

$$k1 = v1w^{*\prime}/v2w^{*\prime}$$

$$v1u^* = k1 \times v2u^{*\prime}$$

$$v1v^* = k1 \times v2v^{*\prime}$$

$$v1w^* = v1w^{*\prime}$$

$$v2u^* = v2u^{*\prime}$$

$$v2v^* = v2v^{*\prime}$$

$$v2w^* = v2w^{*\prime} \tag{7-2}$$

In expression (7-2), in the case where voltage instructions for the failed phases are calculated by using voltage instructions for the other winding group, correction is performed by using k1 which is the ratio between the control output voltage instruction for the normal phase and the control output voltage instruction for this phase of the other winding group. Therefore, when there is variation in the circuit constant of the motor, the characteristics of the voltage application apparatus, or the like, it is possible to calculate more accurately the voltage instruction for the failed phase.

As described above, according to the seventh embodiment, in addition to the effect of the fifth embodiment, even when some of the sensor sections 21 for one winding group have failed, if at least the other sensor section 21 for one phase can normally detect the motor current flowing in the winding for the one phase, correction is performed by using k1 which is the ratio between the control output voltage instruction obtained by detecting the motor current for the normal phase and the control output voltage instruction obtained by detecting the motor current for this phase of the other winding group. Therefore, non-conventional effect is provided that, even when there is variation in the circuit constant of the multiplex-winding motor 1, the characteristics of the voltage application apparatus 3, or the like, the voltage instruction for the failed phase is calculated more accurately.

Eighth Embodiment

Figure 8:
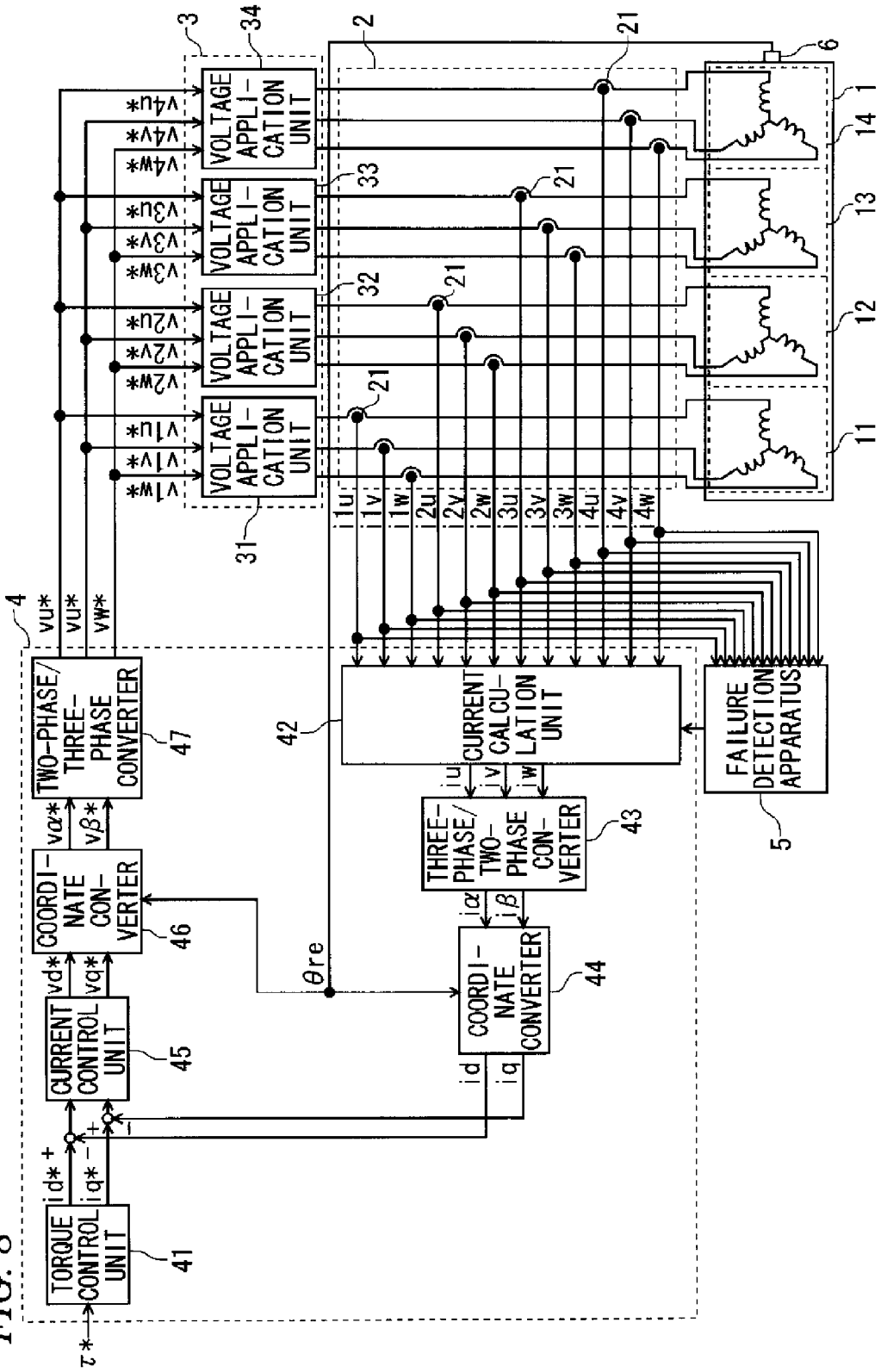
FIG. 8 is a configuration diagram of a driving apparatus for a multiplex-winding motor according to the eighth embodiment of the present invention.

FIG. 8 is a configuration diagram of a driving apparatus for a multiplex-winding motor according to the eighth embodiment of the present invention. Components that correspond to or are the same as those of the first embodiment (FIG. 1) are denoted by the same reference numerals.

In the eighth embodiment, the multiplex-winding motor 1, the voltage application apparatus 3, the current detection apparatus 2, the control apparatus 4, and the failure detection apparatus 5 are different from those of the first embodiment.

That is, the multiplex-winding motor 1 of the eighth embodiment is a synchronous motor having four groups of windings, i.e., first to fourth winding groups 11 to 14 each composed of three-phase windings provided for a stator, and using permanent magnet for a rotor, the four winding groups 11 to 14 having no phase difference thereamong.

Similarly to expression (1-1) of the first embodiment, when the same voltage is applied to the four winding groups 11 to 14, currents flowing in the winding groups 11 to 14 are equal to each other in the respective phases, and when the same current is applied to the winding groups 11 to 14 in the respective phases, voltages applied to the winding groups 11 to 14 are equal to each other.

The voltage application apparatus 3 is composed of four voltage application units 31 to 34, and the voltage application units 31 to 34 are individually connected to the winding groups 11 to 14, respectively. In addition, the current detection apparatus 2 provided between the multiplex-winding motor 1 and the voltage application apparatus 3 has the sensor sections 21 individually provided for the windings for the respective phases of each of the winding groups 11 to 14, and by using the sensor sections 21, the sensor sections 21 detect the motor currents i1u, i1v, i1w, i2u, i2v, i2w, i3u, i3v, i3w, i4u, i4v, and i4w flowing in the windings for the respective phases. In addition, the failure detection apparatus 5 detects whether or not each sensor section 21 of the current detection apparatus 2 has failed, in the same manner as in the first embodiment.

The control apparatus 4 generates voltage instructions v1u*, v1v*, and v1w* to v4u*, v4v*, and vow* with respect to the four winding groups 11 to 14, in the same manner as in the first embodiment, but the operation of the current calculation unit 42 is different from that of the first embodiment.

That is, the current calculation unit 42 calculates the motor currents iu, iv, and iw for the respective phases used for current control, based on detection output from the failure detection apparatus 5, by a method different between when the sensor sections 21 of the current detection apparatus 2 can normally detect current and when failure has occurred.

First, in the case where all the sensor sections 21 of the current detection apparatus 2 can normally detect current, the motor currents iu, iv, and iw for the respective phases used for current control are calculated by using the following expression.

$$iu = \frac{i1u + i2u + i3u + i4u}{4} \tag{8-1}$$

$$iv = \frac{i1v + i2v + i3v + i4v}{4}$$

$$iw = \frac{i1w + i2w + i3w + i4w}{4}$$

On the other hand, in the case where some of the sensor sections 21 of the current detection apparatus 2 have failed and some of the motor currents with respect to the winding groups 11 to 14 cannot be accurately detected by the sensor sections 21, the motor current for each phase of another winding group that is normally detected is used to perform the calculation. For example, it will be assumed that the sensor sections 21 for three phases of the four winding groups 11 to 14 have failed as shown in table 1, so that the corresponding motor currents cannot be accurately detected.

TABLE 1

|  |  | Winding group | | | |
|---|---|---|---|---|---|
|  |  | 11 | 12 | 13 | 14 |
| Phase | U | o | x | x | o |
|  | V | x | o | x | x |
|  | W | x | x | o | x |

(Note)
o = Normal,
x = Failed

In this case, the sensor sections 21 of the current detection apparatus 2 normally detect the motor currents for U-phase of the first and fourth winding groups 11 and 14, the motor current for V-phase of the second winding group 12, and the motor current for W-phase of the third winding group 13. Therefore, the motor currents iu, iv, and iw for the respective phases used for current control are calculated as shown by the following expression.

$$iu = \frac{i1u + i4u}{2} \quad (8\text{-}2)$$
$$iv = i2v$$
$$iw = i3w$$

As described in the first embodiment with reference to the motor model of expression (1-1), when the same voltage is applied to the four winding groups 11 to 14 or the same current is applied to them, expression (8-1) and expression (8-2) are equal to each other. Therefore, even when failure has occurred, it is possible to continue to drive the multiplex-winding motor 1 while calculating the motor currents.

Here, in the case of using a method of, as in the first to seventh embodiments, merely calculating the current or voltage for the phase corresponding to the failed sensor section 21 by using only the current or voltage of the other winding group for which the sensor sections 21 are normal, it is difficult to accurately calculate the motor currents or voltages for the respective phases when a large number of sensor sections 21 have failed so that the sensor sections 21 for different winding groups with respect to the same phase have failed as shown in table 1. For example, in the case of calculating the motor currents for V-phase and W-phase of the first winding group 11 by using the motor currents detected with respect to the other winding groups 12 to 14, the sensor sections 21 cannot accurately detect both motor currents for V-phase and W-phase of each of the second to fourth winding groups 12 to 14, and therefore, the motor currents cannot be calculated.

On the other hand, in the eighth embodiment, whether or not the sensor sections 21 of the current detection apparatus 2 have failed is determined on a phase-by-phase basis. Therefore, the sensor sections 21 for the first and fourth winding groups 11 and 14 detect the motor currents for U-phase, the sensor section 21 for the second winding group 12 detects the motor current for V-phase, and the sensor section 21 for the third winding group 13 detects the motor current for W-phase, whereby the motor currents for the respective phases are calculated by using the detected current motors. That is, according to the eighth embodiment, it is possible to calculate the motor currents iu, iv, and iw for the respective phases as long as the sensor section 21 for at least one winding group is normal in each phase.

As described above, according to the eighth embodiment, in addition to the effect of, when some of the sensor sections 21 of the current detection apparatus 2 have failed, continuing to drive the motor while calculating a voltage instruction based on the motor current with respect to another winding group, non-conventional effect is provided that, even when a large number of sensor sections 21 have failed so that the sensor sections 21 with respect to the same phase in different winding groups have failed, failure of the sensor sections 21 is determined on a phase-by-phase basis to calculate the motor currents, whereby it is possible to continue to drive the multiplex-winding motor 1.

Ninth Embodiment

Figure 9:
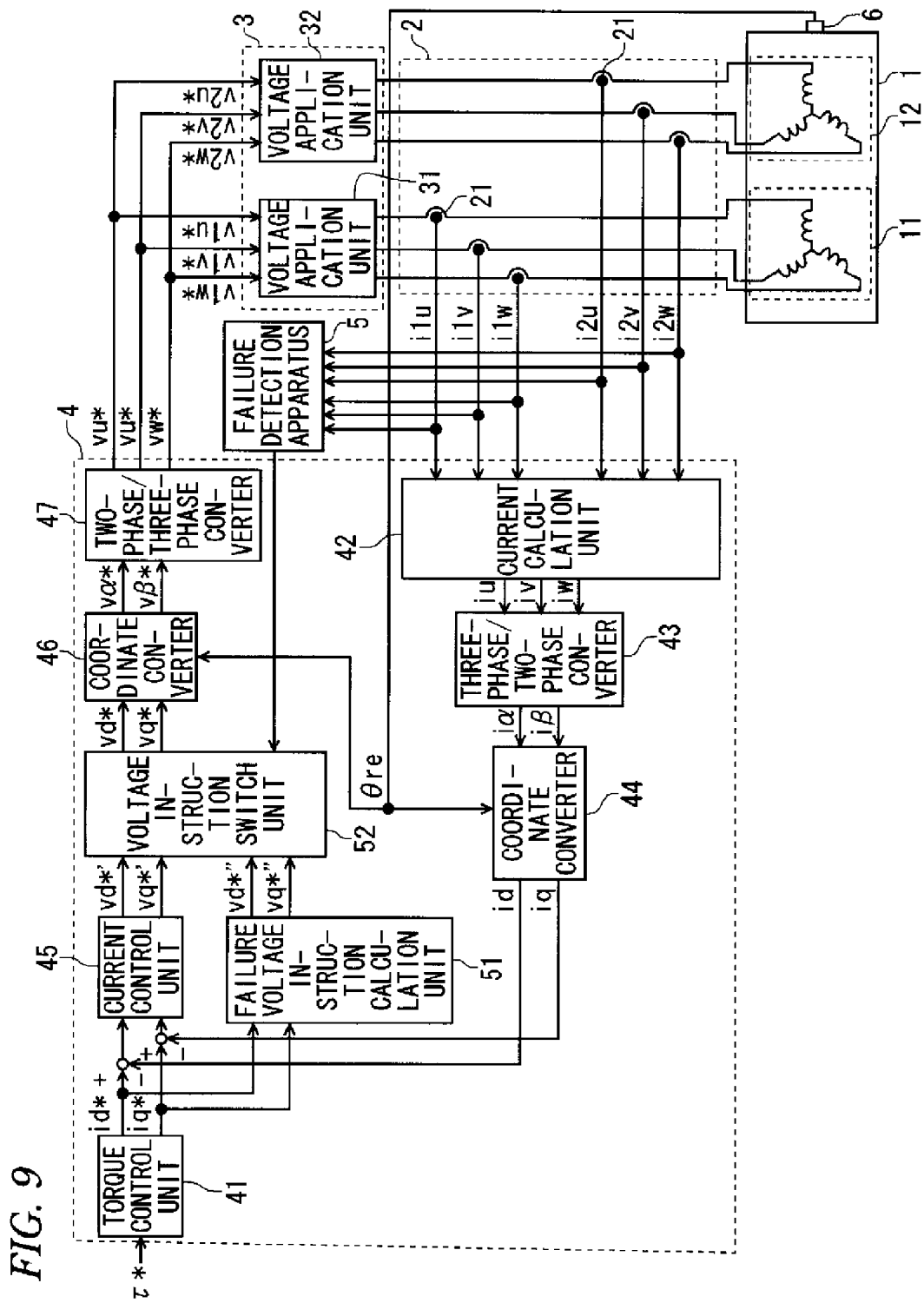
FIG. 9 is a configuration diagram of a driving apparatus for a multiplex-winding motor according to the ninth embodiment of the present invention.

FIG. 9 is a configuration diagram of a driving apparatus for a multiplex-winding motor according to the ninth embodiment of the present invention. Components that correspond to or are the same as those of the first embodiment (FIG. 1) are denoted by the same reference numerals.

The ninth embodiment is the same as the first embodiment in that, in the control apparatus 4, the current calculation unit 42 for coping with failure of some of the sensor sections 21 of the current detection apparatus 2 is provided on the input side of the three-phase/two-phase converter 43. However, in the ninth embodiment, a failure voltage instruction calculation unit 51 and a voltage instruction switch unit 52 are further provided for coping with the case where all the sensor sections 21 of the current detection apparatus 2 have failed. The other configuration is the same as that of the first embodiment.

That is, the failure voltage instruction calculation unit 51 calculates failure voltage instructions vd*''' and vq*''' in a rotational coordinate system, based on the current instruction values id* and iq* in a rotational coordinate system given from the torque control unit 41 in order to drive the motor in a driving condition such as a desired rotation rate or torque, as described later in detail.

Here, a specific calculation method for the failure voltage instructions vd*''' and vq*''' by the failure voltage instruction calculation unit 51 will be described.

The motor model of the multiplex-winding motor is represented by expression (1-1). In expression (1-1), if the differential operator P is assumed to be zero for the purpose of considering stationary state in which iq and id are constant, the motor model of the multiplex-winding motor is represented by the following expression.

$$\begin{bmatrix} v1d \\ v1q \\ v2d \\ v2q \end{bmatrix} = \quad (9\text{-}1)$$

$$R\begin{bmatrix} i1d \\ i1q \\ i2d \\ i2q \end{bmatrix} + \begin{bmatrix} 0 & -\omega_{re}L_{11} & 0 & -\omega_{re}M_{12} \\ \omega_{re}L_{11} & 0 & \omega_{re}M_{12} & 0 \\ 0 & -\omega_{re}M_{12} & 0 & -\omega_{re}L_{11} \\ \omega_{re}M_{12} & 0 & \omega_{re}L_{11} & 0 \end{bmatrix} \begin{bmatrix} i1d \\ i1q \\ i2d \\ i2q \end{bmatrix} +$$

$$\omega_{re}\phi \begin{bmatrix} 0 \\ 1 \\ 0 \\ 1 \end{bmatrix}$$

By substituting the current instruction values i1d*, i1q*, i2d*, and i2q* in a rotational coordinate system for the winding groups 11 and 12, the rotation angle velocity (electric angle) ω, of the motor, and the motor constants R, $L_H$, and θ in expression (9-1), the failure voltage instructions vd*''' and vq*''' in a rotational coordinate system for the winding groups 11 and 12 are calculated so as to drive the motor in a driving condition such as a desired rotation rate or torque. Further, here, since the voltage instructions for the two winding groups 11 and 12 are equal to each other and the currents thereof are also equal to each other, the failure voltage instructions vd*″ and vq*″ in a rotational coordinate system can be calculated by the following expression.

$$\begin{bmatrix} vd^{*\prime\prime} \\ vq^{*\prime\prime} \end{bmatrix} = \begin{bmatrix} R & -\omega_{re}(L_{11}+M_{12}) \\ \omega_{re}(L_{11}+M_{12}) & R \end{bmatrix} \begin{bmatrix} id^* \\ iq^* \end{bmatrix} + \omega_{re}\phi \begin{bmatrix} 0 \\ 1 \end{bmatrix} \quad (9\text{-}2)$$

Next, based on detection output from the failure detection apparatus 5, when all the sensor sections 21 of the current detection apparatus 2 are normal or when it is detected that some of the sensor sections 21 have failed, the voltage instruction switch unit 52 selects the output of the current control unit 45. On the other hand, when it is detected that all the sensor sections 21 of the current detection apparatus 2 have failed, the voltage instruction switch unit 52 selects the output of the failure voltage instruction calculation unit 51.

That is, when all the sensor sections 21 of the current detection apparatus 2 for the respective phases of the winding groups 11 and 12 are normal or when some of the sensor sections 21 have failed, similarly to the first embodiment, the motor currents iu, iv, and iw are calculated by the current calculation unit 42. Therefore, the output of the current control unit 45 is selected as voltage instructions in a rotational coordinate system, as shown by the following expression.

$$vd^*=vd^{*\prime}$$

$$vq^*=vq^{*\prime} \quad (9\text{-}3)$$

On the other hand, when all the sensor sections 21 of the current detection apparatus 2 for the respective phases of the winding groups 11 and 12 have failed, the output of the failure voltage instruction calculation unit 51 is selected as voltage instructions in a rotational coordinate system, as shown by the following expression.

$$vd^*=vd^{*\prime\prime}$$

$$vq^*=vq^{*\prime\prime} \quad (9\text{-}4)$$

Here, in the first to seventh embodiments, when all the sensor sections 21 of the current detection apparatus 2 for the respective phases of the winding groups 11 and 12 have failed, it is impossible to calculate the motor currents and calculate voltage instructions for the multiplex-winding motor 1. On the other hand, in the ninth embodiment, no matter which of the output of the current control unit 45 and the output of the failure voltage instruction calculation unit 51 is selected by the voltage instruction switch unit 52, similarly to the first embodiment, the voltage instructions vd* and vg* in a rotational coordinate system are processed through the coordinate converter 46 and the two-phase/three-phase converter 47, whereby the voltage instructions v1u*, v1v*, and v1w* and the voltage instructions v2u*, v2v*, and v2w* with respect to the two winding groups 11 and 12 are eventually generated and outputted to the voltage application apparatus 3. Therefore, it is possible to continue to drive the motor while calculating voltage instructions from a desired driving condition and the motor model of the multiplex-winding motor 1.

As described above, according to the ninth embodiment, in addition to the effect of, when some of the sensor sections 21 of the current detection apparatus 2 have failed, continuing to drive the multiplex-winding motor 1 while calculating voltage instructions based on the currents of the other winding group, non-conventional effect is provided that, even when all the sensor sections 21 of the current detection apparatus 2 for the respective phases of the winding groups 11 and 12 have failed, voltage instructions are calculated from a desired driving condition and the motor model of the motor, thereby continuing to drive the multiplex-winding motor 1.

Tenth Embodiment

Figure 10:
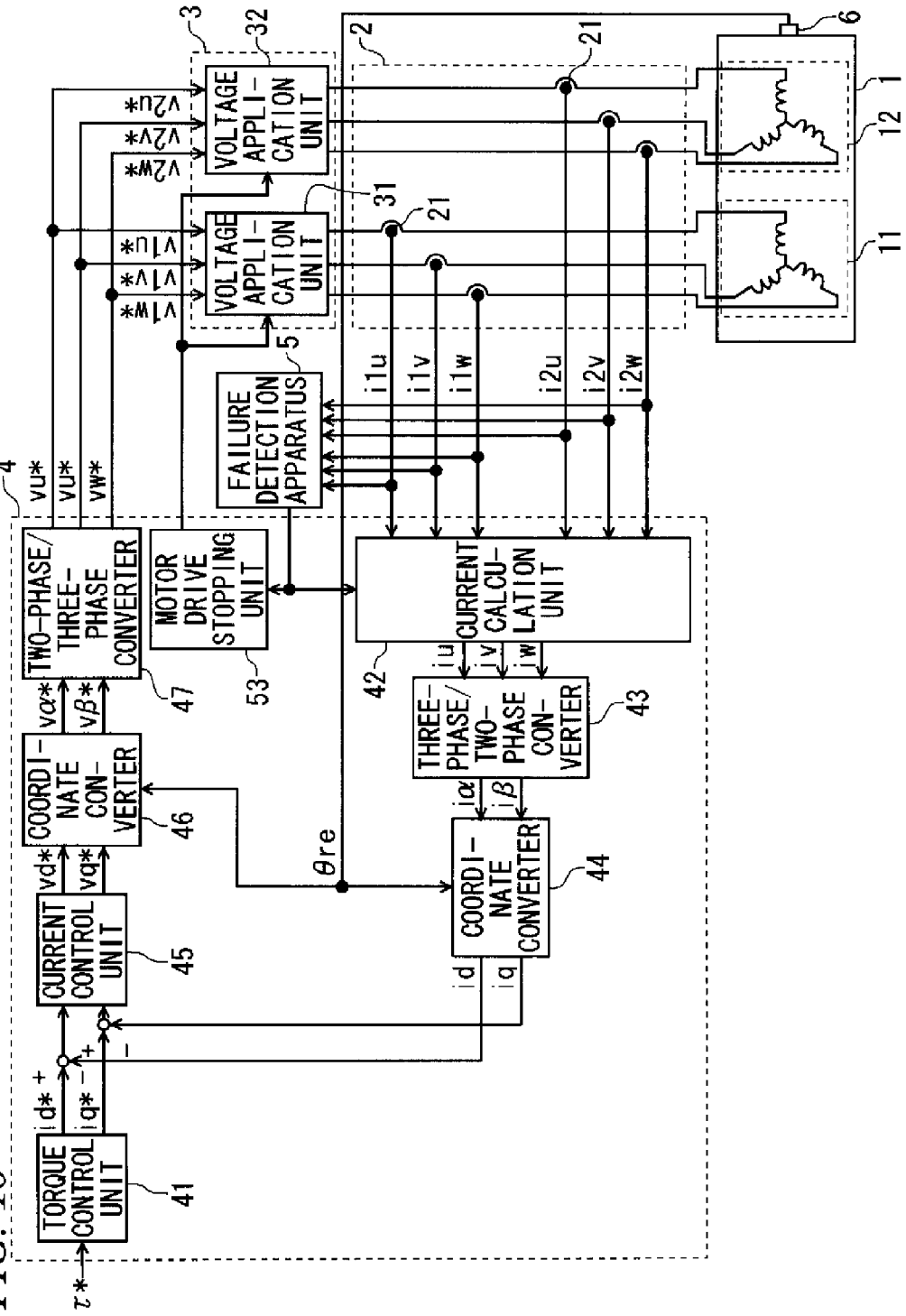
FIG. 10 is a configuration diagram of a driving apparatus for a multiplex-winding motor according to the tenth embodiment of the present invention.

FIG. 10 is a configuration diagram of a driving apparatus for a multiplex-winding motor according to the tenth embodiment. Components that correspond to or are the same as those of the first embodiment (FIG. 1) are denoted by the same reference numerals.

The tenth embodiment is the same as the first embodiment in that, in the control apparatus 4, the current calculation unit 42 for coping with failure of some of the sensor sections 21 of the current detection apparatus 2 is provided on the input side of the three-phase/two-phase converter 43. However, in the tenth embodiment, a motor drive stopping unit 53 is further provided for coping with the case where all the sensor sections 21 of the current detection apparatus 2 have failed. The other configuration is the same as that of the first embodiment.

Here, when all the sensor sections 21 of the current detection apparatus 2 for the respective phases of the winding groups 11 and 12 are normal or when some of the sensor sections 21 have failed, the motor drive stopping unit 53 does not output a motor drive stopping signal. Therefore, as in the first embodiment, the motor currents iu, iv, and iw are calculated by the current calculation unit 42, whereby, similarly to the first embodiment, the voltage instructions v1u*, v1v*, and v1w* and the voltage instructions v2u*, v2v*, and v2w* with respect to the two winding groups 11 and 12 are eventually given from the control apparatus 4 to the voltage application apparatus 3.

On the other hand, when all the sensor sections 21 of the current detection apparatus 2 for the respective phases of the winding groups 11 and 12 have failed, the motor drive stopping unit 53 outputs a motor drive stopping signal for stopping the driving of the motor, to the current calculation unit 42 and the voltage application apparatus 3.

Figure 11:
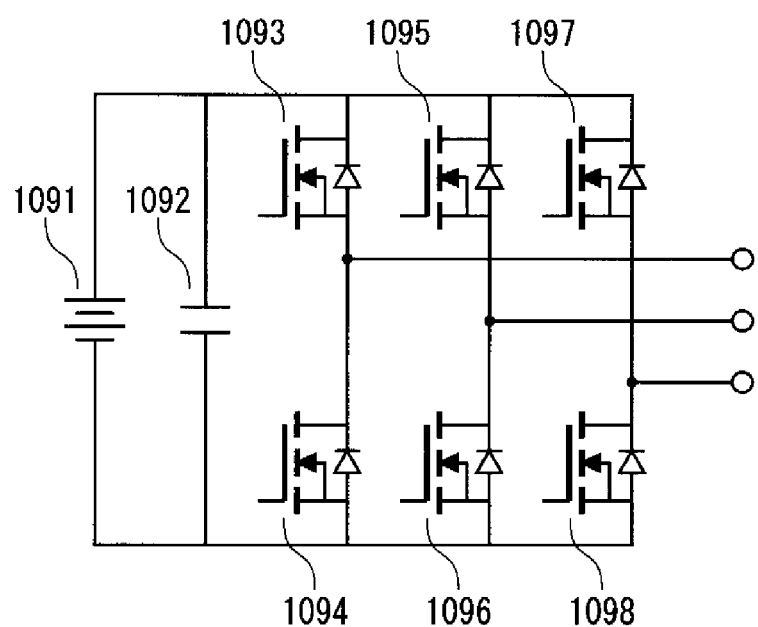
FIG. 11 is a circuit diagram showing the configuration of a voltage application apparatus according to the tenth embodiment of the present invention.

Each of the voltage application units 31 and 32 of the voltage application apparatus 3 is assumed to be an inverter having a configuration shown in FIG. 11, for example. That is, each of the voltage application units 31 and 32 is composed of a DC power supply 1091, a voltage smoothing capacitor 1092, and switching devices 1093 to 1098, and operates the switching devices 1093 to 1098, based on voltage instructions, thereby supplying voltage to the motor.

When each of the voltage application units 31 and 32 of the voltage application apparatus 3 has received a motor drive stopping signal from the failure detection apparatus 5, the voltage application unit turns off the switching devices 1093 to 1098, to stop the driving of the multiplex-winding motor 1. In addition, by the motor drive stopping signal, the current calculation unit 42 also stops its operation at the same time.

Here, in the first to seventh embodiments, when all the sensor sections 21 of the current detection apparatus 2 for the respective phases of the winding groups 11 and 12 have failed, voltage instructions for the multiplex-winding motor 1 cannot be calculated based on currents detected by the sensor sections 21. As a result, the rotation rate can change to a value in the opposite direction different from a desired driving condition for the multiplex-winding motor 1, or torque in the opposite direction can occur. On the other hand, in the tenth embodiment, when all the sensor sections 21 of the current detection apparatus 2 for the respective phases of the winding groups 11 and 12 have failed and voltage instructions cannot be calculated, the driving of the motor is stopped. Therefore, such trouble does not occur.

As described above, according to the tenth embodiment, in addition to the effect of, when some of the sensor sections 21 of the current detection apparatus 2 have failed, continuing to drive the multiplex-winding motor 1 while calculating voltage instructions based on the motor currents of the other winding group, non-conventional effect is provided that, when all the sensor sections 21 of the current detection apparatus 2 for the respective phases of the winding groups 11 and 12 have failed, the driving of the motor is stopped, thereby preventing such trouble that the rotation rate of the multiplex-winding motor 1 changes to a value in the opposite direction different from a desired driving condition or that torque in the opposite direction occurs.

Eleventh Embodiment

Figure 12:
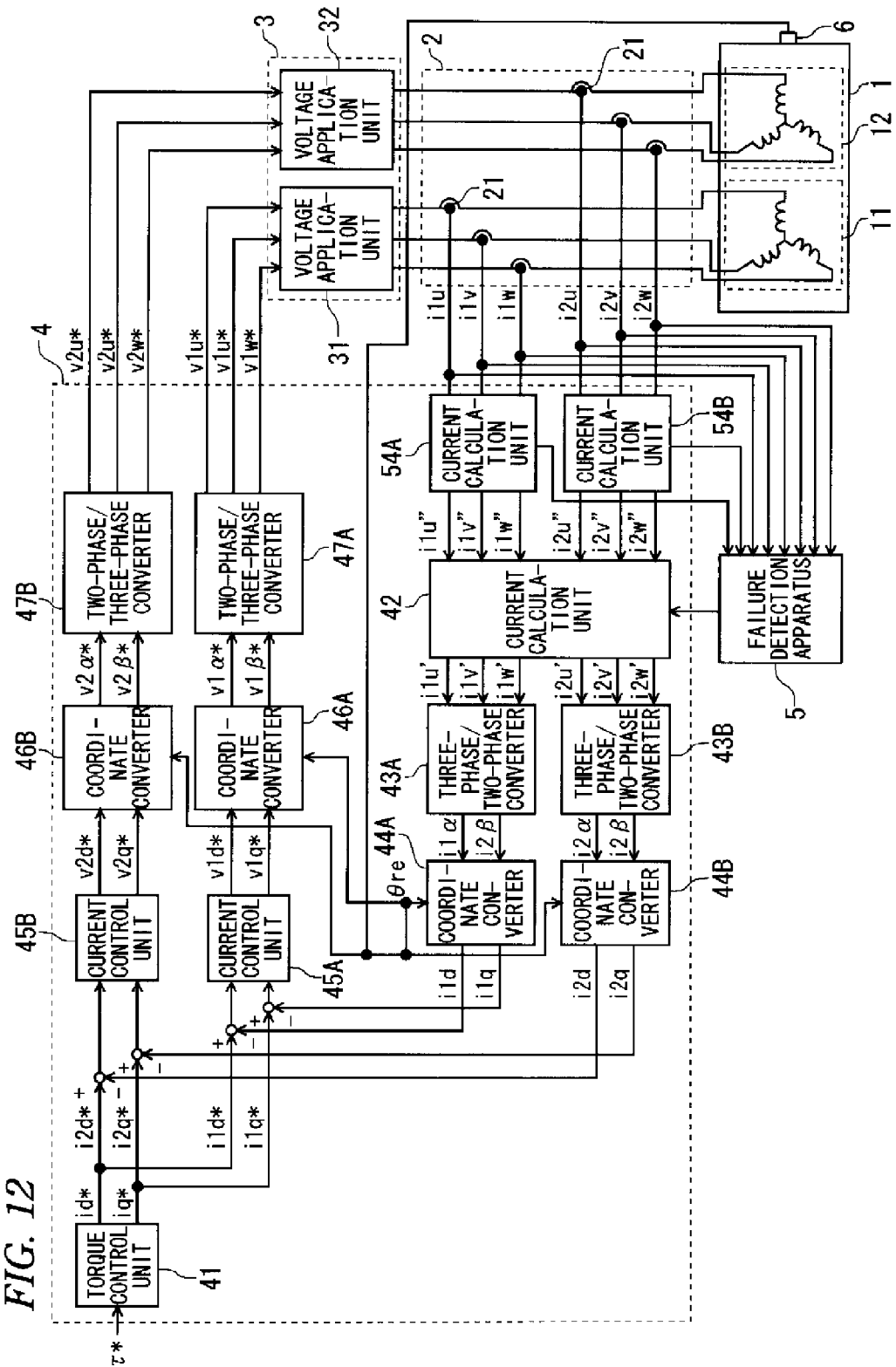
FIG. 12 is a configuration diagram of a driving apparatus for a multiplex-winding motor according to the eleventh embodiment of the present invention.

FIG. 12 is a configuration diagram of a driving apparatus for a multiplex-winding motor according to the eleventh embodiment of the present invention. Components that correspond to or are the same as those of the second embodiment (FIG. 2) are denoted by the same reference numerals.

Also in the eleventh embodiment, similarly to the second embodiment, the control apparatus 4 eventually generates the voltage instructions $v1u^*$, $v1v^*$, and $v1w^*$ and the voltage instructions $v2u^*$, $v2v^*$, and $v2w^*$ with respect to the two winding groups 11 and 12, to output them to the voltage application apparatus 3. However, the control apparatus 4 and the failure detection apparatus 5 are different from those of the second embodiment.

That is, in the control apparatus 4, current calculation units 54A and 54B are provided for the respective winding groups 11 and 12. When the sensor section 21 of the current detection apparatus 2 for one of the three phases of each of the winding groups 11 and 12 has failed, each of the current calculation units 54A and 54B calculates the motor current for the failed phase by using the fact that the sum of the three-phase currents is zero, and outputs, to the failure detection apparatus 5, a current detection enabled signal indicating that the sensor sections 21 of the current detection apparatus 2 can normally detect currents with respect to the winding group.

The failure detection apparatus 5 determines whether or not each sensor section 21 of the current detection apparatus 2 has failed, as in the second embodiment. Here, when the failure detection apparatus 5 receives current detection enabled signals with respect to the winding groups 11 and 12 from the current calculation units 54A and 54B, the failure detection apparatus 5 determines that all the motor currents for each winding group have been normally detected by the sensor sections 21. The current calculation unit 42 changes the output content of each motor current in accordance with the determination result from the failure detection apparatus 5, as described below.

Hereinafter, specific examples of the operations of the current calculation units 54A and 54B, the failure detection apparatus 5, and the current calculation unit 42 will be described.

(I) As the first example, it will be assumed that only the sensor section 21 for U-phase of the first winding group 11 has failed in the current detection apparatus 2. In this case, the current calculation unit 54A calculates detection current for the failed U-phase and detection currents for the other phases of V-phase and W-phase by using the fact that the sum of the three-phase currents is zero, as shown by the following expression, and outputs, to the failure detection apparatus 5, a current detection enabled signal indicating that the sensor sections 21 of the current detection apparatus 2 can normally detect currents with respect to the first winding group 11.

$$i1u''=-i1v-i1w$$

$$i1v''=i1v$$

$$i1w''=i1w$$

On the other hand, since all the sensor sections 21 for the second winding group 12 can normally detect current, the current calculation unit 54B directly outputs detection currents for the three phases, as shown by the following expression, and outputs, to the failure detection apparatus 5, a current detection enabled signal indicating that the sensor sections 21 of the current detection apparatus 2 can normally detect currents with respect to the second winding group 12.

$$i2u''=i2u$$

$$i2v''=i2v$$

$$i2w''=i2w \quad (11\text{-}2)$$

When the failure detection apparatus 5 receives current detection enabled signals from both current calculation units 54A and 54B, the failure detection apparatus 5 determines that all the sensor sections 21 of the current detection apparatus 2 are normal. In accordance with the determination, the current calculation unit 42 directly outputs detection currents inputted from the current calculation units 54A and 54B, as the motor currents for current control, as shown by the following expression.

$$i1u'=i1u''$$

$$i1v'=i1v''$$

$$i1w'=i1w''$$

$$i2u'=i2u''$$

$$i2v'=i2v''$$

$$i2w'=i2w'' \quad (11\text{-}3)$$

(II) As the second example, it will be assumed that the sensor sections 21 for U-phase of the first winding group 11 and U-phase of the second winding group 12 have failed in the current detection apparatus 2. In this case, the current calculation units 54A and 54B calculate detection currents for the three phases as shown by the following expression, and output, to the failure detection apparatus 5, current detection enabled signals indicating that the sensor sections 21 of the current detection apparatus 2 can normally detect currents with respect to the first winding group 11 and the second winding group 12.

$$i1u''=-i1v-i1w$$

$$i1v''=i1v$$

$$i1w''=i1w \quad (11\text{-}4)$$

$$i2v''=i2v$$

$$i2w''=i2w \quad (11\text{-}5)$$

When the failure detection apparatus 5 receives current detection enabled signals from both current calculation units 54A and 54B, the failure detection apparatus 5 determines that all the sensor sections 21 of the current detection apparatus 2 for both winding groups 11 and 12 are normal. In accordance with the determination, the current calculation unit 42 directly outputs detection currents inputted from the current calculation units 54A and 54B, as the motor currents for current control, as shown by the following expression.

$$i1u'=i1u''$$
$$i1v'=i1v''$$
$$i1w'=i1w''$$
$$i1u'=i2u''$$
$$i2v'=i2v''$$
$$i2w'=i2w'' \quad (11\text{-}6)$$

(III) As the third example, it will be assumed that the sensor sections 21 for U-phase of the first winding group 11 and U-phase and V-phase of the second winding group 12 have failed in the current detection apparatus 2. In this case, one current calculation unit 54A calculates detection currents for the three phases with respect to the first winding group 11 as shown by the following expression, and outputs, to the failure detection apparatus 5, a current detection enabled signal indicating that the sensor sections 21 of the current detection apparatus 2 can normally detect currents with respect to the first winding group 11.

$$i1u''=-i1v-i1w$$
$$i1v''=i1v$$
$$i1w''=i1w \quad (11\text{-}7)$$

In addition, since the sensor sections 21 for two phases of U-phase and V-phase of the second winding group 12 have failed, the other current calculation unit 54B directly outputs detection currents of the sensor sections 21 as shown by the following expression, and outputs, to the failure detection apparatus 5, a signal indicating that the sensor sections 21 of the current detection apparatus 2 for the second winding group 12 have failed and cannot detect currents for U-phase and V-phase.

$$i2u''=i2u$$
$$i2v''=i2v$$
$$i2w''=i2w \quad (11\text{-}8)$$

Since the failure detection apparatus 5 receives a current detection enabled signal from the one current calculation unit 54A, the failure detection apparatus 5 determines that all the sensor sections 21 of the current detection apparatus 2 for the first winding group 11 are normal, but determines, based on the signal outputted from the other current calculation unit 54B, that the sensor sections 21 for U-phase and V-phase of the second winding group 12 have failed in the current detection apparatus 2.

In accordance with the determination, the current calculation unit 42 directly outputs currents outputted from the one current calculation unit 54A, as the motor currents for current control with respect to the first winding group 11, as shown by the following expression, and meanwhile, in response to the failed U-phase and V-phase, uses the currents for U-phase and V-phase of the first winding group 11 obtained by the current calculation unit 54A, as the motor currents for current control with respect to the second winding group 12.

$$i1u'=i1u''$$
$$i1v'=i1v''$$
$$i1w'=i1w''$$
$$i2u'=i1u'$$
$$i2v'=i1v'$$
$$i2w'=i2w'' \quad (11\text{-}9)$$

As described above, according to the eleventh embodiment, in addition to the effect of, when some of the sensor sections 21 of the current detection apparatus 2 have failed, continuing to drive the multiplex-winding motor 1 while calculating voltage instructions based on the currents of the other winding group, non-conventional effect is provided that, when the sensor section for one phase of each winding group has failed, the motor current for the failed phase can be calculated through simple calculation using the motor currents obtained by the normal sensor sections for the other phases of the winding group.

In addition, in conventional techniques, in the case where one sensor section 21 for each of different winding groups has failed in the current detection apparatus 2, the motor currents cannot be calculated. On the other hand, in the eleventh embodiment, as shown in the second example, even in the case where one sensor section 21 for each of different winding groups has failed, the motor current for the failed phase can be calculated through simple calculation with respect to the winding group for which the failure has occurred.

Further, in the first to tenth embodiments, current for a failed phase is calculated by using detection currents for the other winding group which are normally detected. Therefore, when failure has occurred with respect to all the winding groups for a certain phase, the motor current for the failed phase cannot be calculated. On the other hand, in the eleventh embodiment, the motor current for the failed phase is individually calculated with respect to each winding group. Therefore, as shown in the second and third examples, even in the case where all the winding groups for the same phase have failed, the motor current can be calculated by using the currents with respect to another winding group for which failure has occurred in one phase or failure does not occur in any phase. In other words, with respect to at least one winding group, as long as the number of the sensor sections 21 that have failed is one or zero, current with respect to another winding group for which failure has occurred can be calculated by using current obtained from the one winding group.

Therefore, according to the eleventh embodiment, non-conventional effect is provided that, even when a large number of sensor sections 21 of the current detection apparatus 2 corresponding to the respective phases of the winding groups of the multiplex-winding motor 1 have failed, the multiplex-winding motor 1 can continue to be driven with excellent control responsiveness while the motor currents are absolutely calculated.

The present invention is not limited to the configurations of the first to eleventh embodiments described above. Various modifications can be made without departing from the intent of the present invention, and the configurations of the first to eleventh embodiments can be combined as appropriate.

For example, in the above description, the current sensors of the current detection apparatus 2 are provided for all the phases of each winding group of the multiplex-winding motor 1. However, they may be provided in the switching devices of the voltage application apparatus 3, or may be provided in series to the switching devices. Further, the current sensor for one phase of the plurality of phases may be omitted, and current for the one phase may be calculated by using the fact that the sum of currents for all phases is zero. In this case, the operation of the present invention corresponds to that when the current sensor for only one phase has failed. In addition, the current detection apparatus 2 may be provided between a DC bus of the voltage application apparatus 3 and the switching devices, and the motor currents may be calculated based on the detection currents and the ON/OFF states of the switching devices. In this case, the operation of the present invention corresponds to that when the current detection apparatus 2 provided on the DC bus detects currents for all the phases of the winding groups. In the first to eleventh embodiments, the voltages or currents of the winding groups are equal to each other. However, in the case where the ratio of voltages or currents differs between the winding groups, voltage instructions or currents may be corrected in consideration of the voltage ratios or the current ratios.

In the third and sixth embodiments, when the voltages or currents of the winding group for which failure has occurred are calculated from the voltages or currents of the other winding group having a phase difference, values in a rotational coordinate system are used. However, values obtained by shifting voltages or currents by a phase difference in three-phase coordinate systems may be used.

In the tenth embodiment, as a method for stopping the driving of the motor, all the switching devices are turned off in the case where the voltage application apparatus 3 is an inverter. However, a relay may be provided between the multiplex-winding motor 1 and the voltage application apparatus 3, and the relay may be turned off.

In the first to eleventh embodiments, the failure detection method by the failure detection apparatus 5 uses the fact that the motor current is zero when the multiplex-winding motor 1 is not driven, or the fact that an instruction value and a detection value of the motor current are substantially equal to each other in stationary state. As a failure detection method of the present invention, other various methods such as a method using voltage instructions for the motor or a method of estimating the motor currents may be used.

In the first to eleventh embodiments, the magnetic pole position detection apparatus 6 detects the magnetic pole/magnetic flux position of the multiplex-winding motor. However, for example, the configuration of estimating the magnetic pole/magnetic flux position as shown in International Publication No. WO2010/109528 or Japanese Patent No. 3683382 may be used.

Various modifications and alterations of this invention will be apparent to those skilled in the art without departing from the scope and spirit of this invention, and it should be understood that this is not limited to the illustrative embodiments set forth herein.

What is claimed is:

1. A driving apparatus for a multiplex-winding motor, the driving apparatus driving the multiplex-winding motor having a plurality of winding groups each including windings corresponding to a plurality of phases, the driving apparatus comprising:
    a current detection apparatus having sensor sections for detecting motor currents flowing in the windings for the phases of the plurality of winding groups;
    a control apparatus for calculating voltage instructions with respect to each winding group, based on the motor current detected by each sensor section of the current detection apparatus;
    a voltage application apparatus for applying voltage to each winding group, based on the voltage instructions; and
    a failure detection apparatus individually detecting whether or not each sensor section of the current detection apparatus has failed, wherein
    the control apparatus, when the failure detection apparatus has detected failure of some of the sensor sections, in accordance with the detection, calculates a voltage instruction with respect to the winding group corresponding to the failure of the sensor section, based on motor current with respect to another winding group detected by the sensor section that can normally detect current.

2. The driving apparatus for the multiplex-winding motor according to claim 1, wherein the control apparatus, when the failure detection apparatus has detected failure of some of the sensor sections, in accordance with the detection, calculates motor current with respect to the winding group corresponding to the failure of the sensor section, based on motor current with respect to another winding group detected by the sensor section that can normally detect current.

3. The driving apparatus for the multiplex-winding motor according to claim 2, wherein
    the multiplex-winding motor is configured such that the winding groups have a phase difference therebetween, and
    the control apparatus, when the failure detection apparatus has detected failure of some of the sensor sections, in accordance with the detection, calculates motor current with respect to the winding group corresponding to the failure of the sensor section, through conversion by the phase difference, based on motor current with respect to another winding group detected by the sensor section that can normally detect current.

4. The driving apparatus for the multiplex-winding motor according to claim 2, wherein the control apparatus, when the failure detection apparatus has detected failure of some of the sensor sections, in accordance with the detection, calculates motor current with respect to the winding group corresponding to the failure of the sensor section, based on motor current for another phase detected by the sensor section, of the sensor sections corresponding to the winding group, that can normally detect current, and on motor current detected by the sensor section, corresponding to each phase of another winding group, that can normally detect current.

5. The driving apparatus for the multiplex-winding motor according to claim 1, wherein the control apparatus, when the failure detection apparatus has detected failure of some of the sensor sections, in accordance with the detection, calculates a voltage instruction with respect to the winding group corresponding to the failure of the sensor section, based on a voltage instruction obtained based on motor current with respect to another winding group detected by the sensor section that can normally detect current.

6. The driving apparatus for the multiplex-winding motor according to claim 5, wherein
    the multiplex-winding motor is configured such that the winding groups have a phase difference therebetween, and
    the control apparatus, when the failure detection apparatus has detected failure of some of the sensor sections, in accordance with the detection, calculates a voltage instruction with respect to the winding group corresponding to the failure of the sensor section, through conversion by the phase difference, based on a voltage instruction obtained based on motor current with respect to another winding group detected by the sensor section that can normally detect current.

7. The driving apparatus for the multiplex-winding motor according to claim 5, wherein the control apparatus, when the failure detection apparatus has detected failure of some of the sensor sections, in accordance with the detection, calculates a voltage instruction with respect to the winding group corresponding to the failure of the sensor section, based on a voltage instruction obtained based on motor current for another phase detected by the sensor section, of the sensor sections corresponding to the winding group, that can normally detect current, and on a voltage instruction obtained based on motor current detected by the sensor section, corresponding to each phase of another winding group, that can normally detect current.

8. The driving apparatus for the multiplex-winding motor according to claim 1, wherein the control apparatus, when the failure detection apparatus has detected failure of some of the sensor sections with respect to every winding group, determines whether or not the sensor section for each winding group has failed on a phase-by-phase basis, and calculates the voltage instruction, based on motor current for each phase, of all the winding groups, for which the sensor section does not fail.

9. The driving apparatus for the multiplex-winding motor according to claim 1, wherein the control apparatus, when the failure detection apparatus has detected failure of all the sensor sections, calculates a voltage instruction with respect to each winding group, based on a driving condition of the multiplex-winding motor and a motor model of the multiplex-winding motor.

10. The driving apparatus for the multiplex-winding motor according to claim 1, wherein the control apparatus, when the failure detection apparatus has detected failure of all the sensor sections, stops the driving of the multiplex-winding motor.

11. The driving apparatus for the multiplex-winding motor according to claim 1, wherein the control apparatus, when only the sensor section for one phase of each winding group has failed in the current detection apparatus, calculates a voltage instruction for the one phase with respect to the winding group for which the sensor section has failed, based on motor currents for the other phases with respect to the winding group detected by the other sensor sections that do not fail, and determines that the sensor sections for the winding group can normally detect current.

12. The driving apparatus for the multiplex-winding motor according to claim 11, wherein the control apparatus, when the sensor section for detecting motor current for one phase with respect to at least one winding group has failed and all the sensor sections with respect to the other winding groups are normal, calculates motor current for the one phase corresponding to the failed sensor section, based on motor currents, of the winding group for which the sensor section has failed, detected by the normal sensor sections for the other phases for which the sensor sections do not fail.

13. The driving apparatus for the multiplex-winding motor according to claim 11, wherein the control apparatus, when the sensor section for detecting motor current for one phase has failed with respect to every winding group, calculates motor current for each phase of each winding group for which the sensor section has failed, based on motor currents of each winding group detected by the normal sensor sections for the other phases for which the sensor sections do not fail.

14. The driving apparatus for the multiplex-winding motor according to claim 11, wherein the control apparatus, when the sensor section for detecting motor current for one phase with respect to one winding group has failed and the sensor sections for two or more phases with respect to each of the other winding groups have failed, with respect to the one winding group, calculates motor current for the one phase corresponding to the failed sensor section, based on motor currents detected by the normal sensor sections for the other phases for which the sensor sections do not fail, and with respect to the other winding groups, uses, for the phases for which the sensor sections do not fail, motor currents detected by the normal sensor sections, and uses, for the phases for which the sensor sections have failed, the motor current for the corresponding phase calculated with respect to the one winding group.

\* \* \* \* \*